(12) United States Patent
Yu et al.

(10) Patent No.: US 11,030,999 B1
(45) Date of Patent: Jun. 8, 2021

(54) WORD EMBEDDINGS FOR NATURAL LANGUAGE PROCESSING

(71) Applicant: Amazon Technologies, Inc., Seattle, WA (US)

(72) Inventors: Boya Yu, Seattle, WA (US); Avani Deshpande, Bothell, WA (US); Adrian Mark McLeod, Seattle, WA (US); Naga Sai Likhitha Patha, Seattle, WA (US); Markus Dreyer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 157 days.

(21) Appl. No.: 16/456,959

(22) Filed: Jun. 28, 2019

(51) Int. Cl.
| | |
|---|---|
| *G10L 15/18* | (2013.01) |
| *G10L 15/30* | (2013.01) |
| *G10L 15/22* | (2006.01) |
| *G06F 40/295* | (2020.01) |

(52) U.S. Cl.
CPC ........ *G10L 15/1815* (2013.01); *G06F 40/295* (2020.01); *G10L 15/22* (2013.01); *G10L 15/30* (2013.01); *G10L 2015/223* (2013.01)

(58) Field of Classification Search
CPC .... G10L 15/1815; G10L 15/22–15/228; G10L 15/30; G06F 40/295
See application file for complete search history.

(56) References Cited

U.S. PATENT DOCUMENTS

| | | | |
|---|---|---|---|
| 10,331,402 B1* | 6/2019 | Spector | G06F 3/167 |
| 10,599,767 B1* | 3/2020 | Matters | G06F 40/242 |
| 2020/0357392 A1* | 11/2020 | Zhou | G10L 15/1822 |
| 2020/0380072 A1* | 12/2020 | Deshmukh | G06F 40/253 |

* cited by examiner

*Primary Examiner* — Abul K Azad
(74) *Attorney, Agent, or Firm* — Pierce Atwood LLP

(57) ABSTRACT

The present disclosure describes the generation and use of word embeddings as part of natural language understanding (NLU) processing performed by a natural language processing system. In at least some examples, the word embeddings may be generated from text corpuses including at least text (representing spoken user inputs) output from automatic speech recognition (ASR) processing. In at least some examples, the word embeddings may be generated from text output from ASR processing and natural language text corresponding to one or more Internet webpages.

20 Claims, 13 Drawing Sheets

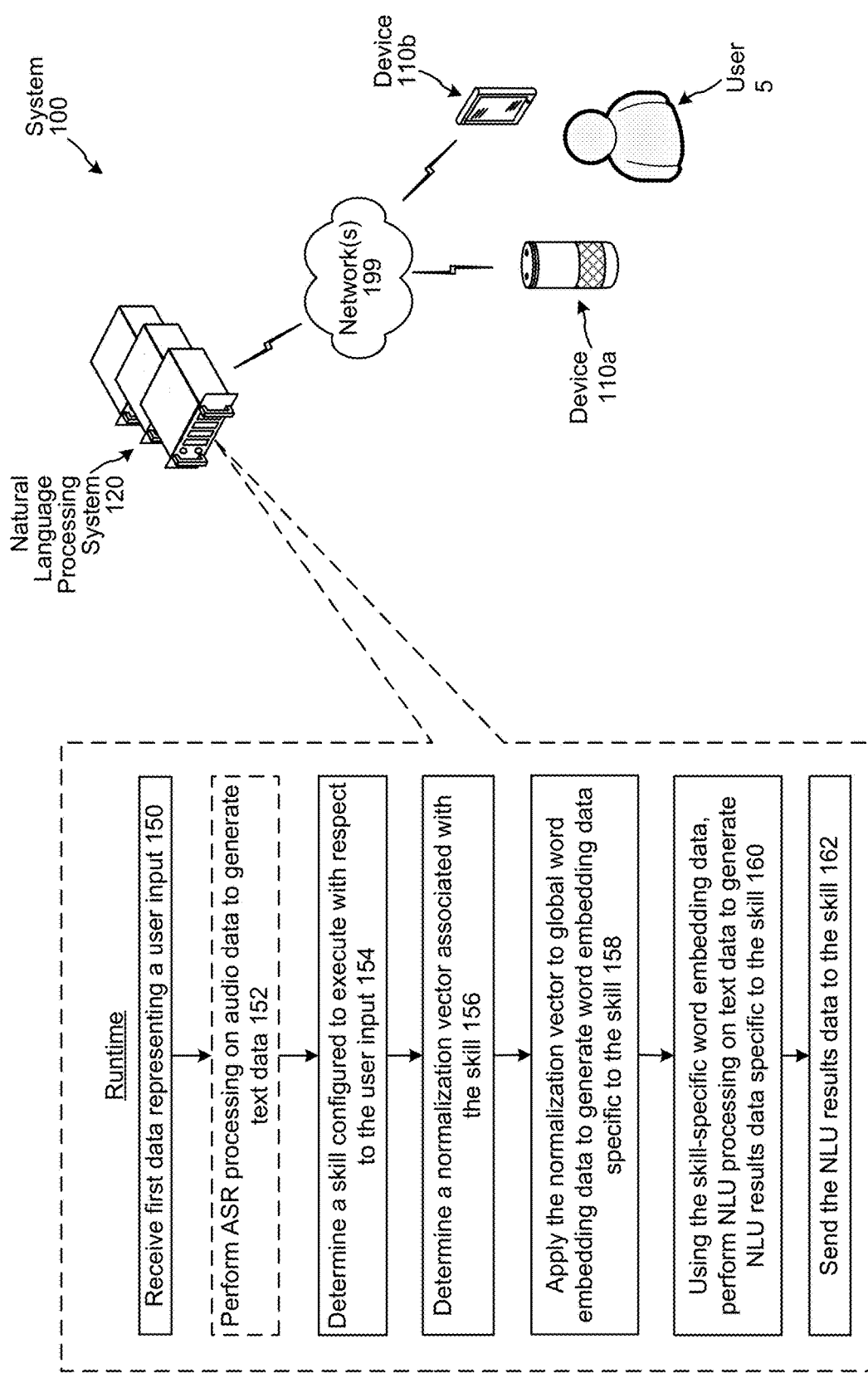

WORD EMBEDDINGS FOR NATURAL LANGUAGE PROCESSING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A is a conceptual diagram illustrating a system for generating skill-specific word embeddings and using same to process user inputs, in accordance with embodiments of the present disclosure.

DETAILED DESCRIPTION

Figure 1B:
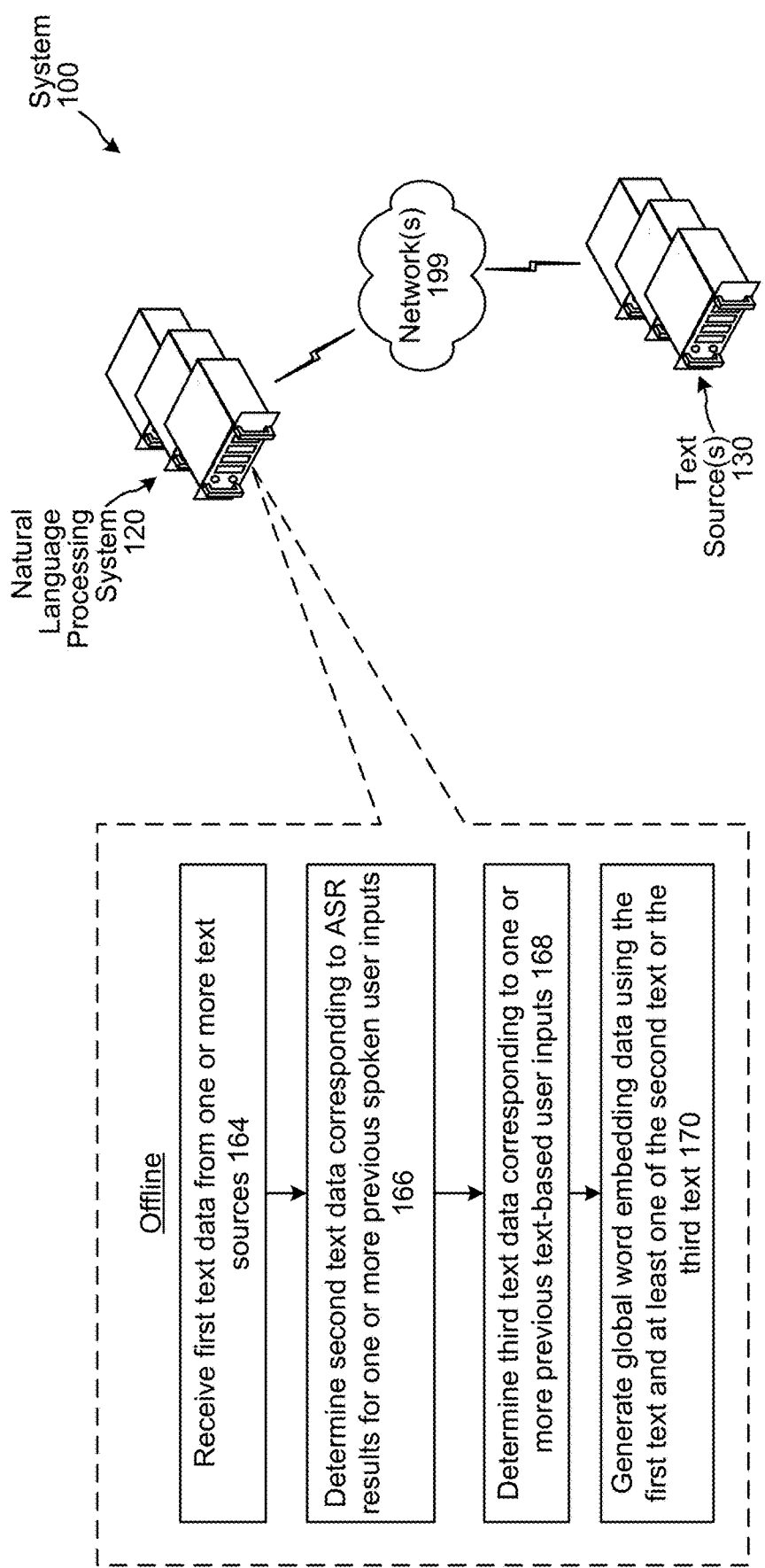
FIG. 1B is a conceptual diagram illustrating a system for generating word embeddings, in accordance with embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Speech processing may also include processing audio data directly into a representation of an utterance (such as in the form of NLU output data) without necessarily going through an ASR process first. Text-to-speech (TTS) is a field of concerning transforming textual data into audio data that is synthesized to resemble human speech.

A natural language processing system may be configured to receive a user input (either spoken or text-based), process the user input to determine an intent of the user, and perform an action based on the intent and substantive content of the user input. For example, for the user input of "play Adele music," a natural language processing system may output music sung by an artist named Adele. For further example, for the user input of "turn on the lights," a natural language processing system may turn on "smart" lights associated with the user's profile.

Processing of a user input may include NLU processing, which may include named entity recognition (NER) processing and intent classification (IC) processing. NER processing identifies portions of text data (either corresponding to a text-based user input or the output of ASR processing) that correspond to named entities. IC processing parses text data (either corresponding to a text-based user input or the output of ASR processing) to determine an intent representing the user input (e.g., representing an action the user desires be performed).

NER processing and/or IC processing may use word embeddings to identify named entities and determine intents, respectively. Conceptually, a word embedding, in at least some examples, is a data representation of a word, for example a data vector including values representing various characteristics of the word. In other words, a word embedding is a representation of a word in the form of a multi-dimensional data vector, where each dimension represents some data point regarding the word, its usage, or other information about the word. Word embeddings map other words like "cat" and "kitty" together due to their semantic similarity, and similarly, phonetic embeddings map nearby sounding words like "psalm" and "some" due to their phonetic similarity.

To generate word embeddings, a text corpus is obtained that represents how words are used. The text corpus may include information such as books, news content, Internet articles, etc. The system then generate multiple vectors, each corresponding to the usage of a particular word (e.g., the usage of the word in the source text corpus), and map those vectors into a vector space. Given the number of dimensions for each vector, the vector space may be a high dimensional vector space. For example, 300-dimensional vectors are possible. The different dimensions for each data vector may correspond to how a word is used in the source text corpus (e.g., whether the word is used as a verb, adverb, noun, adjective, etc.; what words are used before and after a word in the source text corpus; etc.). Thus, word embedding data, represented in the individual values of a word embedding data vector, may correspond to how the respective word is used in the corpus.

A text corpus, for generating word embeddings, may include text from one or more sources. In at least some examples, a text source may be a free source accessed via the Internet. Example text sources includes, but are not limited to Internet-hosted encyclopedias, Internet-hosted dictionaries, or other Internet-hosted texts including natural language.

Using such a text corpus may result in word embeddings representing how individuals may speak in conversational or other natural language and/or how individuals use words in natural language text. The present disclosure improves such natural language processing systems by generating word embeddings using text corpuses including text (representing spoken user inputs) output from ASR processing and/or text corresponding to typed natural language inputs. Such word embeddings not only represent how individuals may speak or type, but may also account for how users specifically formulate user inputs for the natural language processing system. While word embeddings not generated using text representing user inputs may be beneficial in some situations, word embeddings, generated using at least text representing user inputs, may have improved accuracy in at least some situations.

NLU processing may be implemented after ASR processing in a speech processing pipeline of a natural language processing system. In such configurations, NLU processing may be influenced by ASR processing errors (e.g., situations where ASR processing is unable to transcribe a spoken word, or when ASR processing incorrectly transcribes a spoken word into a textual representation of a different word). ASR processing errors may cause errors in NLU processing. Teachings of the present disclosure may decrease NLU processing errors (even when ASR processing results in an error) because generation of word embeddings using ASR output text may adapt word vectors, in the word embeddings, to more accurately reflect how users interact with the natural language processing system (e.g., capturing variation and generalizations of skill-developer provided sample utterances). For example, word embeddings of the present disclosure may enable the natural language processing system to understand "vehicle" even though a developer-provided sample utterance includes "car" but not "vehicle." For further example, "pecan" and "pecon" may have similar embeddings, so NLU processing will understand that "pecon" is an ASR error and should have similar meaning with "pecan" in a natural language input.

The natural language processing system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The natural language processing system and techniques can be implemented on a geographic basis to ensure compliance with laws in various jurisdictions and entities in which the components of the natural language processing system and/or user are located.

FIG. 1A shows a system 100 configured to generate skill-specific word embeddings and use same to process user input. FIG. 1B shows how the system 100 may generate the word embeddings. Although the figures and discussion of the present disclosure illustrate certain steps in a particular order, the steps described may be performed in a different order (as well as certain steps removed or added) without departing from the present disclosure. As shown in FIGS. 1A and 1B, the system 100 may include one or more devices (110a/110b), local to a user 5, in communication with a natural language processing system 120 across one or more networks 199.

Referring to FIG. 1A, the device 110a may receive audio corresponding to a spoken user input originating from the user 5. The device 110a may generate audio data corresponding to the audio and may send the audio data to the natural language processing system 120. Alternatively, the device 110b may receive a typed, text-based user input from the user 5. The device 110b may generate text data corresponding to the text and may send the text data to the natural language processing system 120.

The device 110 may send the audio data and/or text data to the natural language processing system 120 via an application installed on the device 110. A application may enable the device 110 to communicate with the natural language processing system 120 via the network(s) 199. An example application is the Amazon Alexa application that may be installed on a smart phone, tablet, television, or the like.

The natural language processing system 120 may receive (150) first data representing the user input. The first data may be audio data when the user input is a spoken user input. The first data may be text data when the user input is a text-based user input.

If the first data is audio data, the natural language processing system 120 may perform (152) ASR processing on the audio data to generate ASR results data (e.g., text data representing the spoken user input).

The natural language processing system 120 may determine (154) a skill configured to execute with respect to the user input. The natural language processing system 120 may determine the skill in a variety of manners. In at least some examples, the natural language processing system 120 may determine the skill based on the skill being indicated, in a user profile of the user 5, as being enabled to process with respect to the user inputs of the user 5. In at least some examples, the skill may additionally or alternatively be determined based on one or more words represented in text data (e.g., as received from the device 110b or as output from ASR processing). For example, the natural language processing system 120 may determine a weather skill if the text data includes the word "weather." For further example, the natural language processing system 120 may determine a music streaming skill if the text data includes the word "song." Other examples are possible and will be readily apparent to one skilled in the art.

The natural language processing system 120 may determine (156) a normalization vector associated with the skill. As used herein, a "normalization vector" may refer to data representing how features of global word embedding data are to be configured/weighted to transform the global word embedding data into word embedding data specific to a skill. As used herein, "global word embedding data" may refer to one or more word embeddings that are not configured with respect to any particular skill. That is, global word embedding data may represent relationships between words based on how the words are used in natural language that is not specific to any particular skill. The skill-specific word embedding data may represent relationships between words based on how the words may be used in natural language inputs to invoke a particular skill. In at least some examples, a normalization vector may be generated using ASR results data associated with a specific skill (e.g., representing a natural language input that resulted in that skill receiving NLU results data). The natural language processing system 120 may apply (158) the normalization vector (determined at step 156) to global word embedding data to generate word embedding data specific to the skill determined at step 154).

The natural language processing system 120 may, using the skill-specific word embedding data, perform (160) NLU processing on text data (e.g., text data received at step 158 or text data output by ASR processing) to generate NLU results data specific to the skill. The natural language processing system 120 may send (162) the NLU results data to the skill, which may then perform an action, responsive to the user input, based at least in part on the NLU results data. For example, if the user input corresponds to "what is the weather," the action performed may correspond to outputting synthesized speech (e.g., TTS generated audio data) corresponding to weather information for a geographic location corresponding to the device 110. For further example, if the user input corresponds to "purchase laundry detergent," the action performed may correspond to the natural language processing system 120 ordering laundry detergent from an electronic shopping service using detergent preferences, payment information, and shipping information stored with respect to the user 5's profile. Other examples are possible and will be readily apparent to one skilled in the art.

In at least some examples, the natural language processing system 120 may determine more one that one is configured to executed with respect to the user input. In such examples, the natural language processing system 120 may determine a respective normalization vector for each skill. The normalization vector may include weight data that may be used to adjust the values for word embedding data so the result is word embedding data that is normalized, e.g., normalized across a skill. The natural language processing system 120 may thereafter, for each normalization vector, apply the normalization vector to the global word embedding data to generate word embedding data specific to the skill. For example, the system 120 may take the dot product of the normalization vector and the global word embedding data to generate the word embedding data specific to the skill. The natural language processing system 120 may thereafter generate NLU results data for each skill using each skill's skill-specific word embedding data. A skill's NLU results data may be associated with a value representing a likelihood that the NLU results data represent the user input (e.g., a likelihood that the user intended for the skill to be invoked to respond to the user input). The natural language processing system 120 may determine the highest scoring NLU results data, and send the highest scoring NLU results data to the skill corresponding thereto so the skill can perform an action responsive to the user input.

In at least some examples, an NLU component, of the natural language processing system 120, may load global word embedding data once, and store the global word embedding storage in long term storage. In other words, the NLU component may not load the global word embedding data each time the NLU component is invoked to process with respect to a user input. However, the NLU component may not store skill-specific word embedding data in long-term storage. Rather, at runtime, when the NLU component is invoked, the NLU component may determine or receive a normalization vector for a skill, generate skill-specific word embedding data, and temporarily cache the skill-specific word embedding data until the NLU component is done using the skill-specific word embedding data to process a present user input, at which time the skill-specific word embedding data may be deleted from the temporary cache. The foregoing processing has several technical benefits including, but not limited to, limiting the amount of storage needed by the NLU component for storing word embedding data.

The global word embedding data may be generated using various types of data (as illustrated in FIG. 1B). For example, the natural language processing system 120 may receive (164) first text data from one or more text sources 130. A text source 130 may refer to an Internet-hosted encyclopedia, Internet-hosted dictionary, or other Internet-hosted grouping of text including natural language. For a given webpage, the natural language processing system 120 may read a natural language text of the webpage, and store a copy of the natural language text as text data. The first text data of step 150 may include natural language text corresponding to various webpages including natural language text.

The natural language processing system 120 may determine (166) second text data corresponding to ASR results for one or more previous spoken user inputs received by the natural language processing system 120. The natural language processing system 120 may additionally or alternatively determine (168) third text data corresponding to one or more previous text-based user inputs received by the natural language processing system 120. The natural language processing system 120 may generate (170) global word embedding data using the first text and at least one of the second text or the third text.

In at least some examples, the global word embedding data may be generated using second text data and/or third text data corresponding to previous user inputs of multiple users of the natural language processing system 120. In such examples, the global word embedding data may represent how users of the natural language processing system 120 collectively formulate natural language. In at least some other examples, the global word embedding data may be generated using second text data and/or third text data corresponding to previous user inputs of a particular user of the natural language processing system 120. In such examples, the global word embedding data may represent how the particular user generally (e.g., with specificity to any particular skill) formulates user inputs.

Figure 2:
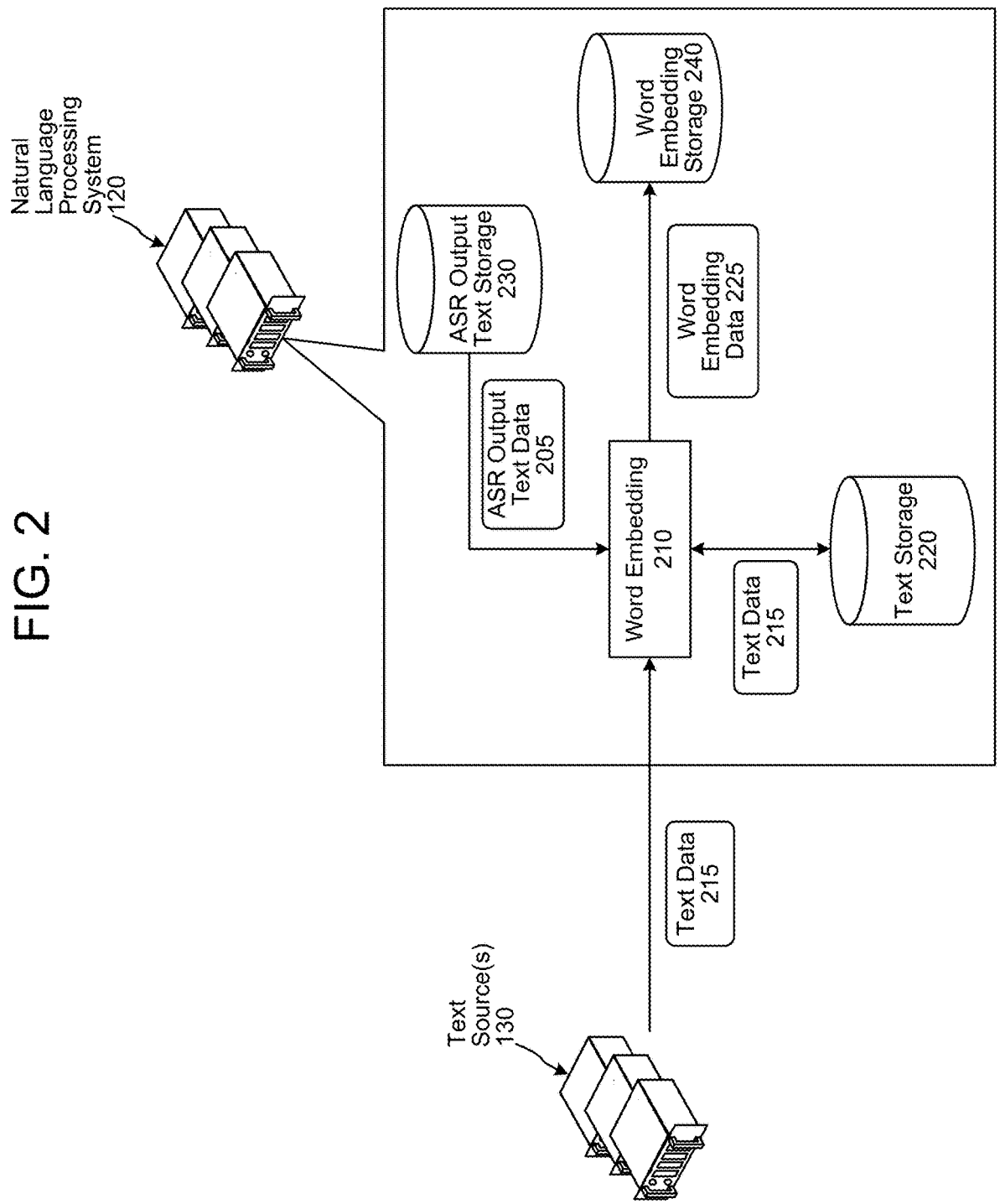
FIG. 2 is a conceptual diagram illustrating how a word embedding component may generate word embedding data, in accordance with embodiments of the present disclosure.

The natural language processing system 120 may include a word embedding component 210 configured to generate word embedding data including one or more word embeddings. As illustrated in FIG. 2, the word embedding component 210 may receive text data 215 from a text source 130. The text data 215 may include natural language text of an Internet-hosted encyclopedia, Internet-hosted dictionary, etc. The word embedding component 210 may store the text data 215 in a text storage 220.

The natural language processing system 120 may determine a domain to which received text data 215 relates. The natural language processing system 120 may determine a domain based on a heading of a webpage corresponding to the received text data 215, the words contained within the text data 215, or some other mechanism. Example domains include shopping, music, weather, smart home, and the like. The natural language processing system 120 may associate, in the text storage 220, the text data 215 with an identifier representing the domain. The natural language processing system 120 may perform such determination and store such association with respect to each portion of text data received from a text source 130.

In at least some examples, the word embedding component 210 may receive extensible markup language (XML) data from a text source 130. In such examples, the word embedding component 210 may store the XML data in the text storage 220. As with the text data 215, the word embedding component 210 may associate the XML data with a domain identifier in the text storage 220.

The natural language processing system 120 may store ASR output text data in an ASR output storage 230. The ASR output storage 230 may store ASR output text data associated with various users of the system. As such, a portion of ASR output text data may be associated with a user identifier corresponding to a user that provided the spoken user input resulting in the portion of ASR output text. Additionally or alternatively, a portion of ASR output text data may be associated with an identifier of a domain to which an NLU component, of the natural language processing system 120, determined the portion of the ASR output text data related to at runtime processing. Additionally or alternatively, a portion of ASR output text data may be associated with a skill identifier corresponding to a skill that was invoked at runtime to perform an action responsive to the user input to which the portion of the ASR output text data corresponds. For example, ASR output text data stored in ASR output storage 230 may be indexed or otherwise associated with data indicating what skill (e.g., what skill system 725 discussed below) was invoked as a result of processing the specific item of ASR output text data. Thus the system 100 may be able to identify, by skill, groups of ASR output text data for use in creating/processing word embeddings as discussed herein.

A "skill" may be software running on the system 100 that is akin to a software application running on a traditional computing device. That is, a skill may enable the system 100 to execute specific functionality in order to provide data or produce some other requested output. The software corresponding to a skill may be associated with a single skill identifier. The skill identifier may be used by the system to assign computing tasks to be performed. What is described herein as a skill may be referred to using many different terms, such as an action, bot, app, or the like.

When creating word embedding data that is not specific to any particular domain, skill, and/or user, the word embedding component 210 may query the text storage 220 for text data 215, and may query the ASR output text storage 230 for ASR output text data 205. In at least some examples, the word embedding component 210 may generate word embedding data 225 specific to a particular user (e.g., for use at runtime with respect to user inputs received from the user). In such examples, the word embedding component 210 may query the text storage 220 for text data 215, and may query the ASR output text storage 230 for ASR output text data 205 associated with the user's identifier. In at least some other examples, the word embedding component 210 may generate word embedding data 225 specific to a skill (e.g., for use at runtime to determine whether a user input corresponds to the skill). In such examples, the word embedding component 210 may query the text storage 220 for text data 215, and may query the ASR output text storage 230 for ASR output text data 205 associated with the skill's identifier. In at least some other examples, the word embedding component 210 may generate word embedding data 225 specific to a domain (e.g., for use at runtime to determine whether user input corresponds to the domain). In such examples, the word embedding component 210 may query the text storage 220 for text data 215 associated with the domain's identifier, and may also query the ASR output text storage 230 for ASR output text data 205 associated with the domain's identifier.

The word embedding component 210 may store the word embedding data 225 in a word embedding storage. If the word embedding data 225 is specific to a user, the word embedding data 225 may be associated with the user's identifier in the word embedding storage 240. If the word embedding data 225 is specific to a skill, the word embedding data 225 may be associated with the skill's identifier in the word embedding storage 240. If the word embedding data 225 is specific to a domain, the word embedding data 225 may be associated with the domain's identifier in the word embedding storage 240.

In at least some examples, the word embedding data 225 may be associated with more than one particular user, skill, or domain. In such examples, the word embedding data 225 may be associated with the appropriate user identifier, skill identifier, and/or domain identifier in the word embedding storage 240.

The word embedding component 210 may use various techniques to generate the word embedding data 225. For example, the word embedding component 210 may use supervised and/or unsupervised learning techniques. A number of known techniques for manipulating vectors in high dimensional (or other) vector space may be used to analyze vectors and compare vectors to each other (e.g., for the purpose of generating the word embedding data 225). Illustrative known embedding techniques that may be used include, but are not limited to, skip gram and/or GloVe: Global Vectors for Word Representation project by Jeffery Pennington, Richard Socher, and Christopher D. Manning of the Computer Science Department of Stanford University published in 2014. Example skip-gram techniques include word2vec (described in Distributed Representations of Words and Phrases and their Compositionality by Tomas Mikolov, Kai Chen, Greg Corrado, and Jeffrey Dean, published in 2013) and FastText (described in Enriching Word Vectors with Subword Information by Piotr Bojanowski, Edouard Grave, Armand Joulin, and Tomas Mikolov in 2016). Other word embedding techniques include Skip-Thought Vectors by Ryan Kiros, Yukun Zhu, Ruslan Salakhutdinov, Richard S. Zemel, Antonio Torralba, Raquel Urtasun, Sanja Fidler, Quick-Thought Vectors/Quick-Thought loss techniques by Lajanugen Logeswaran and Honglak Lee, and other techniques.

The skip-gram technique may be used to slice sentences into skip-grams for the purposes of predicting context words. For example, for the phrase "apples taste sweet," a skip-gram technique may generate:

p(taste|apples)
p(sweet|apples)
p(apples|taste)
p(sweet|taste)
p(apples|sweet)
p(taste|sweet)

where the word after "(" but prior to "|" represents context in which a word (represented in the above after "|" by prior to ")") is used in natural language.

A skip-gram technique may, in at least some examples, implement the following function with generating word embedding data:

$$p(c \mid w) = \frac{\text{score}(c, w)}{\sum_{c'} \text{score}(c', w)}$$

where:

$$\text{score}(c,w) = \exp g_c^T f_w,$$

where:
$g_c$=context embedding
$f_w$=word embedding.

The GloVe technique may implement a regression model to generate word embedding data. In at least some examples, a GloVe technique may implement the following functions:

$$\sum_{(c,w)} (\text{score}(c, w) - \log \text{count}(c, w))^2$$

where score(c, w) approximates co-occurrence counts.

The word embedding data 225 may include various word embeddings. What is described herein as word embeddings may be referred to using many different terms, such as word vectors, word representations, word features, or the like.

Figure 3:
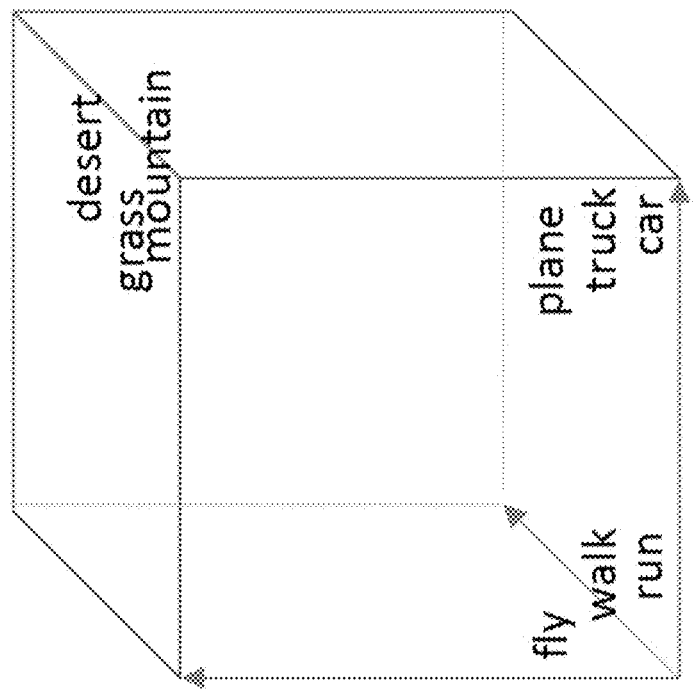
FIG. 3 is a conceptual diagram of an example of word embedding data, in accordance with embodiments of the present disclosure.

The word embedding data 225 may include floating point vectors. FIG. 3 illustrates example word embeddings for the words fly, walk, run, plane, truck, car, desert, grass, and mountain. The word embeddings illustrated in FIG. 3 may correspond to the following floating 3-point vectors:

| | |
|---|---|
| fly | [0.1, 0.4, 0.1] |
| walk | [0.2, 0.1, 0.4] |
| run | [0.3, 0.05, 0.2] |
| plane | [0.8, 0.4, 0.3] |
| truck | [0.85, 0.3, 0.2] |
| car | [0.9, 0.1, 0.1] |
| desert | [0.7, 0.8, 0.7] |
| grass | [0.6, 0.7, 0.4] |
| mountain | [0.65, 0.6, 0.3] |

Similar words (e.g., words corresponding to similar classifications) are grouped together. For example, the words fly, walk, and run may be categorized as methods of transportation. For further example, the words, plane, truck, and car may be categorized as transportation vehicles. In another example, the words desert, grass, and mountain may be categorized as geographic regions. One skilled in the art will appreciate that other groupings may be generated based on the words in the corpus used to generate the word embedding data 225.

Figure 4:
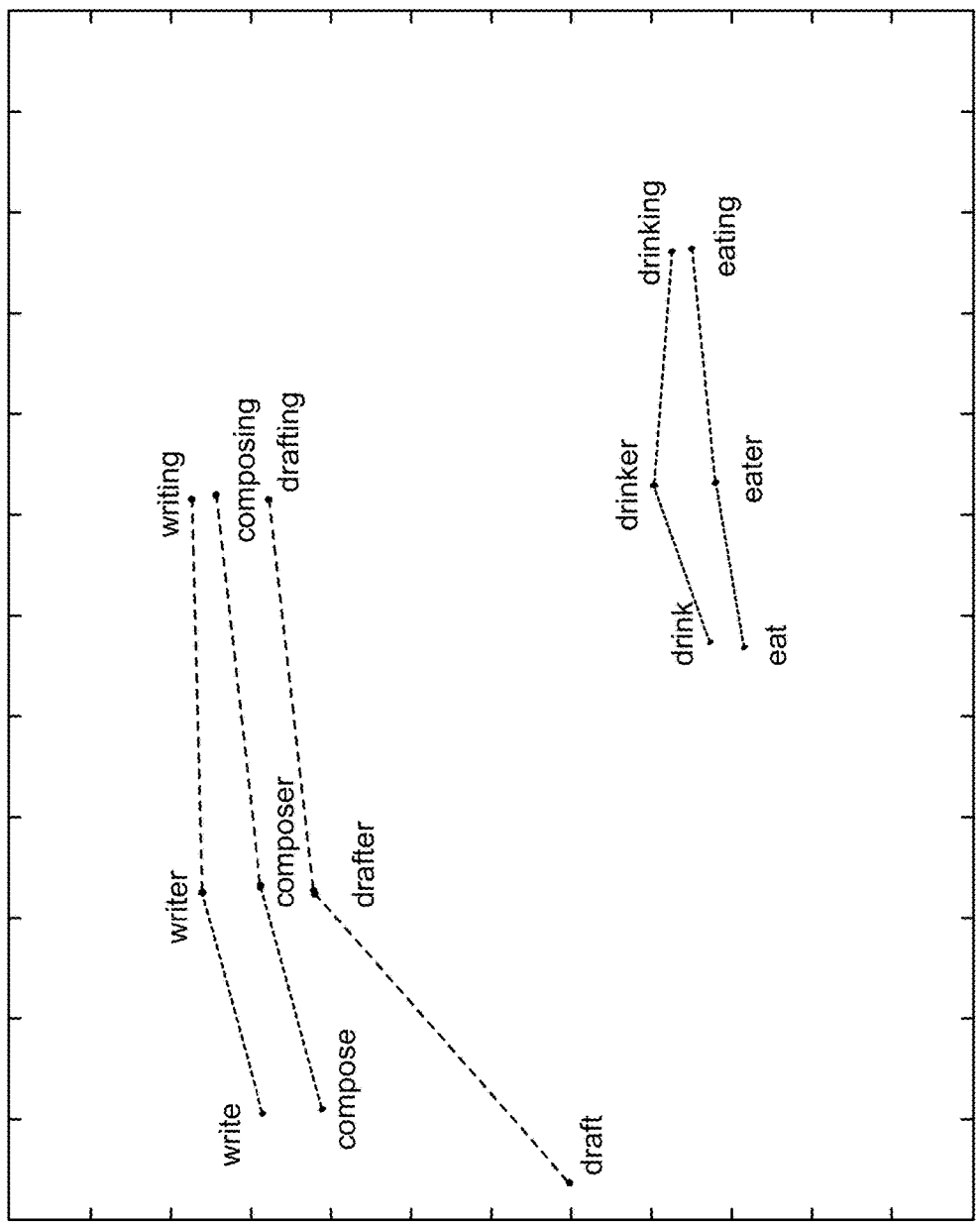
FIG. 4 is a conceptual diagram of an example of word embedding data encoding semantic relationships and similarities, in accordance with embodiments of the present disclosure.

The word embedding data 225 may, in at least some examples, include word embeddings that encode semantic relationships and similarities (as illustrated in FIG. 4). As illustrated in FIG. 4, certain words that have similar meaning may be close to each other in the vector space (indicating a similarity of usage characteristics). Also, certain words that have different meanings may also be close to each other in the vector space (also indicating a similarity of usage characteristics). In the top portion of FIG. 4, words "writer," "composer" and "drafter" are located near each other, indicating that those three words are used similarly in the word data used to generate the vectors of FIG. 4. Similarly, the words "writing," "composing" and "drafting" are also located near each other, also indicating that those three words are used similarly. The words "write," "compose," and "draft" are not as close in the illustration, with "draft" in particular being located farther away from "write" and "compose" than those words are to each other. This distance may be due to other uses of the word "draft" that may differ from "write" and "compose," for example, "draft" has a known noun form, where the "write" and "compose" do not and "draft" may also have other meanings (such as a cold interior breeze) that differ from "write" and "compose."

In at least some examples, a word embedding of the present disclosure may include phonetic information. Such may enable the mapping of nearby sounding words like "pecon" and "pecan" due to their phonetic similarity.

Further, the variations of the words (save for "draft") have similar usage relationships relative to each other. For example, the usage relationships of "write" to "writer" to "writing" is similar to the usage relationship between "compose" to "composer" to "composing" as shown by the lines connecting those triplets of words. Other, non-illustrated variations may also exist (such as "writes," "drafted," etc.) with their own vectors and usage relationships to other words.

Representing words in a vector space may be useful for showing the relationship between usage of individual words, as well as showing the relationship between usage of variations of a particular word and showing the relationship between the same usage variation across different word roots. Thus, a vector space may be used to represent sematic relationships between words as geometric relationship between vectors. For example, FIG. 4 illustrates a number of words in a hypothetical vector space where each point represents the vector location for the particular word. Although illustrated as located in a two-dimensional graph for discussion purposes, the usage vectors for the words illustrated in FIG. 4 would be in a high dimensional space. Further, FIG. 4 is shown for example purposes only and the vector locations/relationships do not necessarily reflect a true graphing of the usage of the illustrated words.

Figure 5:
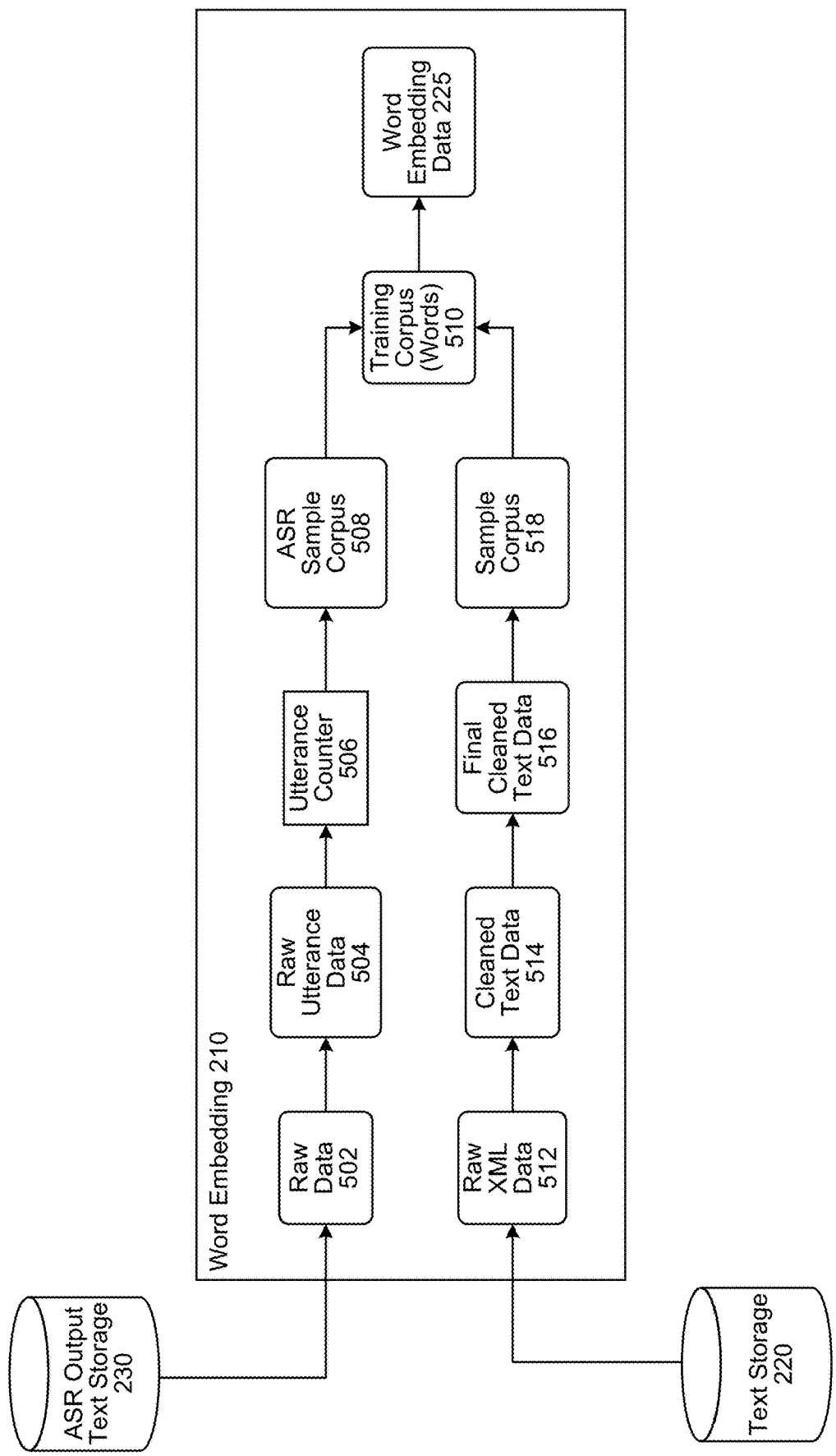
FIG. 5 is a conceptual diagram of an example of how word embedding data may be generated, in accordance with embodiments of the present disclosure.

FIG. 5 illustrates an example of how the word embedding component 210 may generate the word embedding data 225. The word embedding component 210 may receive raw data 502 from the ASR output text storage 230. If the word embedding data 225 is to be specific to a user, the word embedding component 210 may query the ASR output text storage 230 for raw data 502 associated with the user's identifier. If the word embedding data 225 is to be specific to a skill, the word embedding component 210 may query the ASR output text storage 230 for raw data 502 associated with the skill's identifier. If the word embedding data 225 is to be specific to a domain, the word embedding component 210 may query the ASR output text storage 230 for raw data 502 associated with the domain's identifier. If the word embedding data 225 is to be specific to more than one of a specific user, a specific skill, or a specific domain, the word embedding component 210 may query the ASR output text storage 230 for raw data 502 associated with more than one of the user's identifier, the skill's identifier, and the domain's identifier.

In at least some examples, the raw data 502 may be a tab separated value (TSV) file including information about previously spoken natural language inputs (received at runtime). In the raw data 502, each portion of text data (representing a separate spoken natural language user input) may be associated with information including, but not limited to, a device identifier representing a device that captured the spoken natural language input, a user identifier corresponding to the user that spoken the spoken natural language input, and/or a length of the spoken natural language input (e.g., measured in time, such as seconds).

The word embedding component 210 may generate raw utterance data 504 from the raw data 502. In at least some examples, the raw data 502 may be "cut" to generate the raw utterance data 504. Such cutting may include picking text data, representing a spoken natural language input, from the raw data 502. Put another way, only the text data, and not the information associated with the text data in the raw data 502, may be included in the raw utterance data 504.

The word embedding component 210 may include an utterance counter 506. The utterance counter 506 may count a frequency of each spoken natural language input represented in the raw utterance data 504. For example, an output of the utterance counter may be:

"Stop": 200000
"Yes": 100000
"Turn on the light": 50000
"Yes no sorry stop": 10

After the utterance counter 506 processes, the word embedding component 210 may reduce the occurrence of high frequency spoken natural language inputs (e.g., spoken natural language inputs that are represented in the raw utterance data 506 at least a threshold number of time) by using a natural logarithm of the count, to generate an ASR sample corpus 508. In the aforementioned sample utterance counter 506 output, "stop" may correspond to 200000 Log 200000=12.2. Thus, in the ASR sample corpus 508, there may only be 12 occurrences of the spoken natural language input "stop." This processing may prevent (or minimize) the word embedding data 225 (corresponding to the ultimately trained word embedding) from having bias towards high frequency spoken natural language inputs.

The word embedding component 210 may also receive raw XML data 512 from the text storage 220. If the word embedding data 225 is to be specific to a domain, the word embedding component 210 may query the text storage 220 for raw XML data 512 associated with the domain's identifier. The raw XML data 512 may have a data structure corresponding to a known open standard.

The word embedding component 210 may generate cleaned text data 514 from the raw XML data 512. The cleaned text data 514 may include natural language statements and phrases represented in the raw XML data 512. Various programming languages may be used to generated the cleaned text data 514 from the raw XML data 512. An example programming language that may be used includes Perl.

The word embedding component 210 may generate final cleaned text data 516 from the cleaned text data 514. Generation of the final cleaned text data 516 may include removing punctuations from the cleaned text data 514, lowercasing all words in the cleaned text data 514, and/or changing text in the cleaned text data 514 from written form to spoken form. For example, if the cleaned text data 514 includes "On Sep. 11, 2009, a new TV series came out, the corresponding text in the final cleaned text data 516 may be "on September eleventh two thousand and nine a new t. v. series came out".

The word embedding component 210 may generate a sample corpus 518 from the final cleaned text data 516. Generation of the sample corpus 518 may include removing significantly long and significantly short rows of text from the final cleaned text data 516. Generation of the sample corpus 518 may additionally or alternatively removing rows of text in the final cleaned text data 516 that only include titles of webpages from which the raw XML data 512 was generated.

The word embedding component 210 may use the ASR sample corpus 508 and the sample corpus 518 to form a training corpus of words 510. The word embedding component 210 may perform one or more of the word embedding techniques herein to generate the word embedding data 225 from the training corpus of words 510.

NER processing identifies portions of text data (e.g., words) that corresponds to named entities known to the natural language processing system 120. As such, in at least some examples, the word embedding data 225 may be used to perform NER processing.

In some instances, the word embedding storage 240 may store different versions of word embedding data for different skills. For example, a first skill's word embedding data may be generated using text data 215, but not ASR output text data 205. However, a second skill's word embedding data may be generated using text data 215 and ASR output text data 205. Such a situation may occur when the natural language processing system 120 originally generated word embedding data using only text data (e.g., corresponding to one or more Internet webpages), is transitioning to generating word embedding data using both text data (e.g., corresponding to one or more Internet webpages) and ASR output text data, and has updated the word embedding data for the second skill but not the first skill.

When generating word embedding data (for a particular skill for example) using both text data (e.g., corresponding to one or more Internet webpages) and ASR output text data, the word embedding component 210 may use word embedding data that was previously generated for the skill using only text data (e.g., corresponding to one or more Internet webpages). In such an example, the word embedding component 210 may generate word embedding data using only ASR output text data associated with the skill's identifier, and may normalize that word embedding data with the aforementioned previously generated word embedding data (for example, by multiplying a vector by a normalization vector) to generate, for the skill, word embedding data generated using both text data (e.g., corresponding to one or more Internet webpages) and ASR output text data. In at least some examples, the foregoing normalization processing may include dividing each dimension of the word embedding by its standard deviation (and optionally multiplying by some constant value). In other word, each dimension may be normalized by a fixed interval.

In at least some examples, when the word embedding data may be normalized using min-max normalization. For example, for word embedding data 225 that is specific to a skill, each word may correspond to a different feature in the word embedding. Each feature may be normalized between a minimum value (e.g., 0) and a maximum value (e.g., 1).

The post-normalization word embedding data may be associated with the skill's identifier in the word embedding storage 240. Before, simultaneously, or after such is stored, the previously generated word embedding data (e.g., generated using only text data corresponding to one or more Internet webpages) associated with the skill's identifier may be deleted from the word embedding storage 240.

Figure 6:
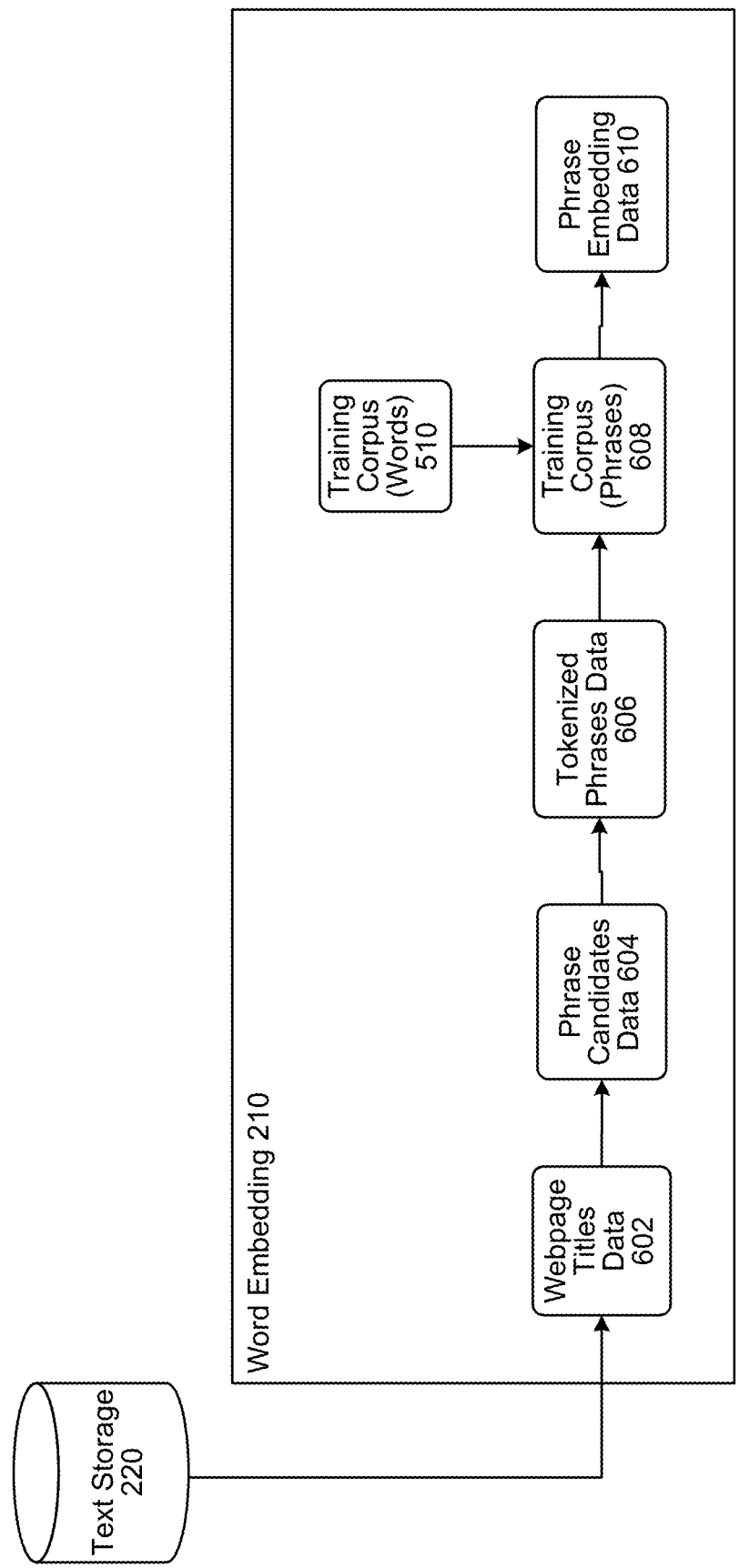
FIG. 6 is a conceptual diagram of an example of how phrase embedding data may be generated, in accordance with embodiments of the present disclosure.

The word embedding component 210 may also generate phrase embedding data 610 (as illustrated in FIG. 6). In at least some examples, the phrase embedding data 610 may be a fixed length embedding vector representing multiple words. In at least some other examples, the phrase embedding data 610 may include multiple word embedding vectors appended to each other. In at least some other examples, the phrase embedding data 610 may include multiple word embedding vectors averaged together. Other examples are also possible. In at least some examples, the phrase embedding data 610 may only include phrases corresponding to proper nouns, such as names of locations, names of people, etc.

As illustrated in FIG. 6, the word embedding component 210 may receive webpage titles data 602 from the text storage 220. If the phrase embedding data 610 is to be specific to a domain, the word embedding component 210 may query the text storage 220 for webpage titles data 602 associated with the domain's identifier. In at least some examples, the webpage titles data 602 may be a text file where each row is a title of a webpage.

The word embedding component 210 may generate phrase candidates data 604 from the webpage titles data 602. One or more filtering processes may, in at least some examples, be performed on the webpage titles data 602 to generate the phrase candidates data 604. In at least some examples, generate of the phrase candidates data 604 may include removing certain phrases from the webpage titles data 602. Such phrases may include, for example, "a", "the", "list of", etc.

The word embedding component 210 may generate tokenized phrases data 606 from the phrase candidates data 604. Generation of the tokenized phrases data 606 may include removing punctuations from the phrase candidates data 604, lowercasing all words in the phrase candidates data 604, and/or changing text in the phrase candidates data 604 from written form to spoken form.

The word embedding component 210 may use the tokenized phrases data 606 and the training corpus or words 510 to form a training corpus of phrases 608. In at least some examples, this may include placing an underscore between words in a phrase. For example the phrase "new york" may become "new_york".

The word embedding component 210 may perform one or more of the embedding techniques disclosed herein, and/or those known in the art, to generate phrase embedding data 610 from the training corpus of phrases 608. The phrase embedding data 610 may be stored in the word embedding storage 240 and/or a phrase embedding storage (not illustrated). In at least some examples, the word embedding component 210 may use the following functions to generate the phrase embedding data 610:

$$v_{sentence} = \frac{\Sigma_{words} w_{word} v_{word}}{\Sigma_{words} w_{word}}$$

$$w_{word} = \frac{a}{a + p(\text{word})}$$

In at least some examples, each word, in the training corpus of words 510 may be associated with a respective value and a respective weight. The value of a word need not be normalized. The weight of a word may be configured based on how frequent the word is used in natural language. In at least some examples, the more frequent the word is used, the smaller the word's weight, and vice versa. As an example, the word "the" may be associated with a relatively small weight.

IC processing determines an intent of a user input based on phrasing of the user input. As such, in at least some examples, the phrase embedding data 610 may be used to perform IC processing.

As described above, in some instances, the word embedding storage 240 may store different versions of word embedding data for different skills. Likewise, the word embedding storage 240 (or another storage) may store different versions of phrase embedding data 610. For example, first phrase embedding data may be generated using text data 215, but not ASR output text data 205. However, second phrase embedding data may be generated using text data 215 and ASR output text data 205. At runtime, it may be desirable to use the same versions (e.g., only generated using text data (e.g., corresponding to one or more Internet webpages), or generated using both text data (e.g., corresponding to one or more Internet webpages) and ASR output text data) of the word embedding data and phrase embedding data for performing NER processing and IC processing, respectively.

Word embeddings may be different depending on language (e.g., English, French, Spanish, etc.). In at least some examples, the natural language processing system 120 may communicate with devices 110 in geographic locations corresponding to different locations. As such, the word embedding storage 240 may store word embedding data 225 and/or phrase embedding data 610 for different languages. Thus, in addition to being associated with a user identifier, skill identifier, and/or domain identifier, word embedding data 225 and phrase embedding data 610 may be associated with a geographic location identifier and/or a language identifier.

Figure 7:
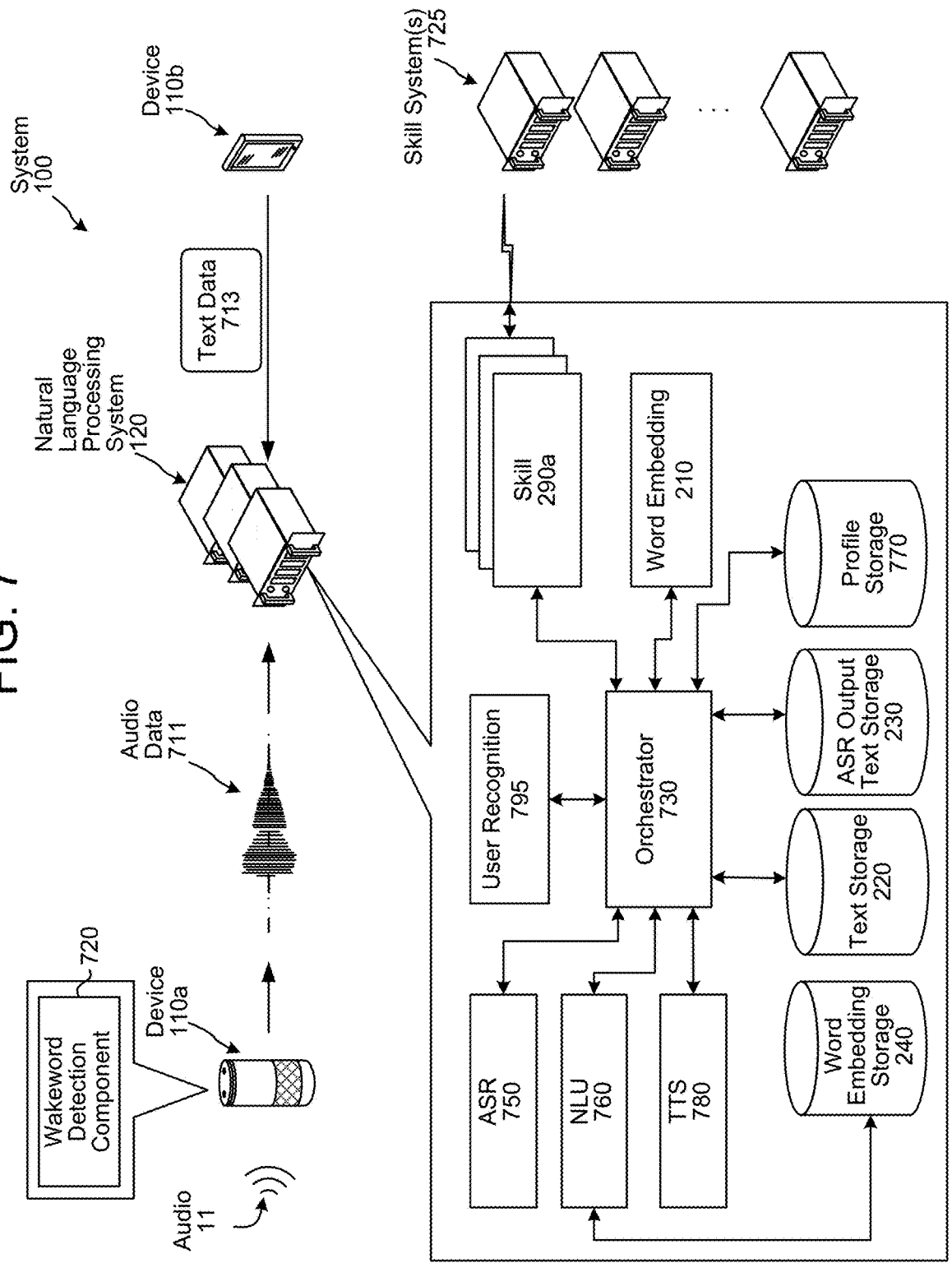
FIG. 7 is a conceptual diagram of components of a system, in accordance with embodiments of the present disclosure.

The foregoing describes example offline processing that may be performed to generate word embeddings and phrase embeddings. The following describes example runtime processing that may be performed in response to the natural language processing system 120 receiving data representing a user input. With respect to FIG. 7, the various components may be located on same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 720 to perform wakeword detection to determine when a user intends to speak an input to the natural language processing system 120. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 720 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 720 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 711, representing the audio 11, to the natural language processing system 120. The audio data 711 may include data corresponding to the wakeword, or the device 110a may remove the portion of the audio corresponding to the wakeword prior to sending the audio data XAA11 to the natural language processing system 120.

An orchestrator component 730 may receive the audio data 711. The orchestrator component 730 may include memory and logic that enables the orchestrator component 730 to transmit various pieces and forms of data to various components of the system 100, as well as perform other operations.

The orchestrator component 730 sends the audio data 711 to an ASR component 750. The ASR component 750 transcribes the audio data 711 into ASR results data (e.g., text data). The text data output by the ASR component 750 represents one or more than one (e.g., in the form of an n-best list) ASR hypotheses representing speech represented in the audio data 711. The ASR component 750 interprets the speech in the audio data 711 based on a similarity between the audio data 711 and pre-established language models. For example, the ASR component 750 may compare the audio data 711 with models for sounds (e.g., subword units, such as phonemes, etc.) and sequences of sounds to identify words that match the sequence of sounds of the speech represented in the audio data 711. The ASR component 750 outputs text data representing one or more ASR hypotheses. The text data output by the ASR component 750 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 110b may receive a text-based user input. The device 110b may generate text data 713 representing the text-based user input. The device 110a may send the text data 713 to the natural language processing system 120. The orchestrator component 730 may receive the text data 713.

The orchestrator component 730 may send text data (e.g., text data output by the ASR component 750 or the received text data 713) to an NLU component 760.

In at least some examples, once global word embedding data is generated, the NLU component 760 may load and store such global word embedding data. By loading and storing global word embedding data as such, the NLU component 760 may ensure such data is available to process various user inputs, without needing to load the global word embedding data each time a user input is received. This may decrease the amount of latency needed to load the global word embedding data.

In contrast, the NLU component 760 may, in at least some examples, not load user identifier specific and/or skill identifier specific word embedding data until after it is determined that a present user input corresponds to the user identifier and/or skill identifier. For example, a user recognition component 795, of the natural language processing system 120, may output a user identifier corresponding to a user that originated a present user input. Thereafter, profile storage 770, of the natural language processing system 120, may be accessed to determine skill identifiers corresponding to skills that have been enabled with respect to the user identifier. Thereafter, the NLU component 760 may load word embedding data that is associated with the user identifier and/or skill identifier, and this word embedding data may be used to perform NER processing with respect to ASR results data representing the present user input.

Similarly, user identifier specific and/or skill identifier specific data, usable to perform IC processing, may not be loaded until after it is determined that a present user input corresponds to the user identifier and/or skill identifier. For example, the user recognition component 795 may output a user identifier corresponding to a user that originated a present user input. Thereafter, the profile storage 770 may be accessed to determine skill identifiers corresponding to skills that have been enabled with respect to the user identifier. Thereafter, the NLU component 760 may load word embedding data that is associated with the user identifier and/or skill identifier, and this word embedding data may be used to perform NER processing with respect to ASR results data representing the present user input.

In at least some examples, a user may engage in a dialog with the natural language processing system 120. As used herein, "dialog" may refer to data transmissions (such as relating to multiple user inputs and natural language processing system 120 outputs) between the natural language processing system 120 and a device(s) 110 that all relate to a single originating user input. Thus, the data transmissions of a dialog may be associated with a same dialog identifier. The dialog identifier may be used by components of the overall system 100 to track information across the dialog. For example, a device 110 may send the natural language processing system 120 data corresponding to "Alexa, play jeopardy." The natural language processing system 120 may send, to the device 110, data corresponding to a jeopardy statement to be output to a user(s). A user may then respond to the statement, which the device 110 sends as data to the natural language processing system 120. The sending of data from the device 110 to the natural language processing system 120 and the sending of data from the natural language processing system 120 to the device 110 may all correspond to a single dialog identifier. In some examples, a dialog-initiating user input may start with a wakeword and end with a command, such as "Alexa, play jeopardy," where "Alexa" is the wakeword and "play jeopardy" is the command. Subsequent user inputs of the same dialog may or may not start with speaking of a wakeword. Each user input of a dialog may be associated with a unique user input identifier such that multiple user input identifiers may be associated with a single dialog identifier.

Figure 8:
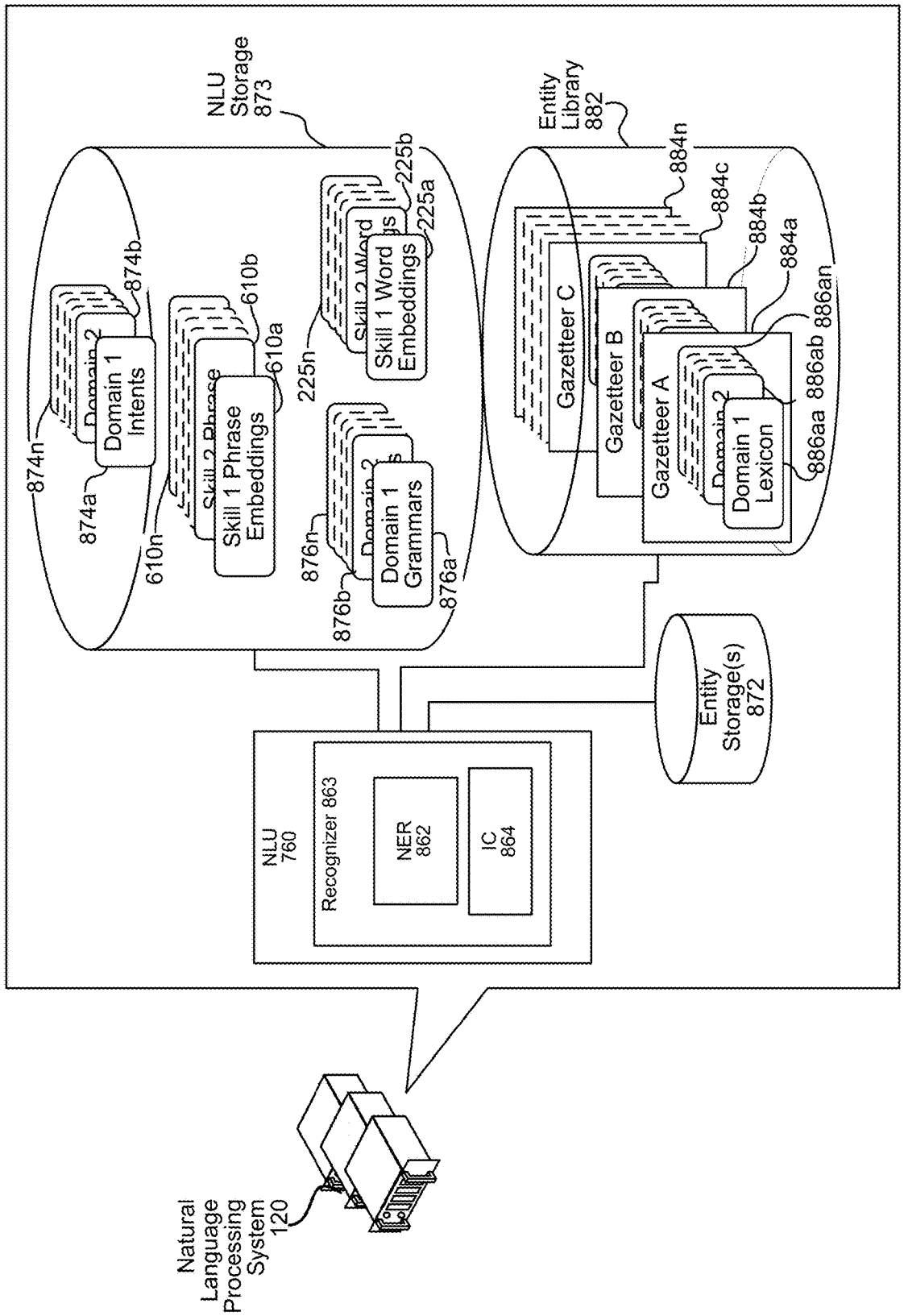
FIG. 8 is a conceptual diagram illustrating how NLU processing may be performed, in accordance with embodiments of the present disclosure.
Figure 9:
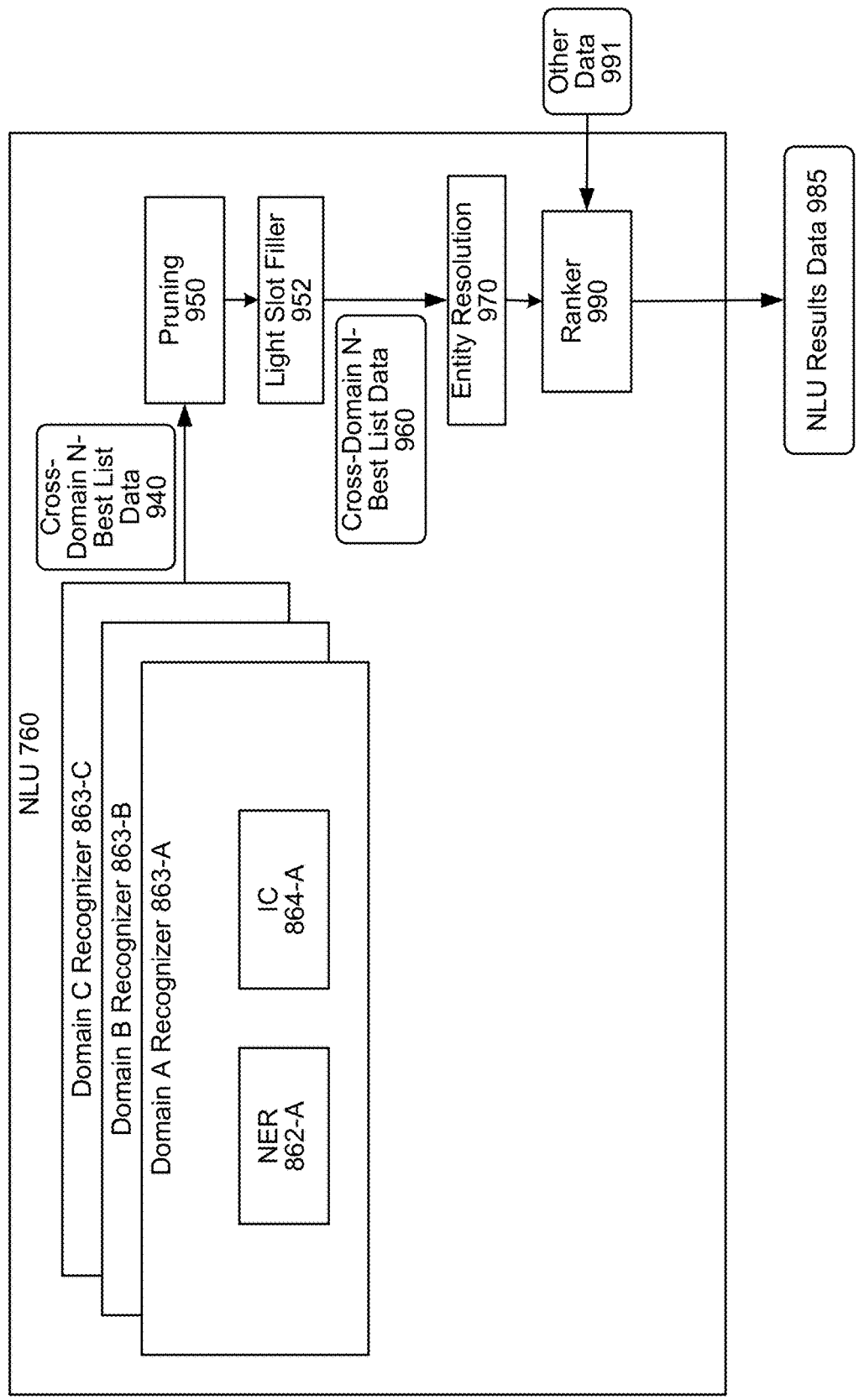
FIG. 9 is a conceptual diagram illustrating how NLU processing may be performed, in accordance with embodiments of the present disclosure.

The NLU component 760 attempts to make a semantic interpretation of the natural language phrase(s) or statement(s) represented in the received text data. FIGS. 8 and 9 illustrate how the NLU component 760 may perform NLU processing to generate NLU results data. The NLU component 760 may process text data including several ASR hypotheses of a single spoken user input. For example, if the ASR component 750 outputs text data including an n-best list of ASR hypotheses (with each ASR hypothesis corresponding to a different textual representation of a spoken user input), the NLU component 760 may process the text data with respect to all (or a portion of) the ASR hypotheses represented therein.

As illustrated in FIG. 8, the NLU component 760 may include one or more recognizers 863. Each recognizer 863 may be associated with a different domain (e.g., smart home, video, music, weather, custom, etc.).

Each recognizer 863 may include a named entity recognition (NER) component 862 that attempts to identify grammars and lexical information that may be used to construe meaning with respect to text data input therein. The NER component 862 identifies portions of text data that correspond to a named entity associated with a domain, associated with the recognizer 863 implementing the NER component 862. The NER component 862 (or other component of the NLU component 760) may also determine whether a word refers to an entity whose identity is not explicitly mentioned in the text data, for example "him," "her," "it" or other anaphora, exophora, or the like.

Each recognizer 863 may be associated with particular grammar 876, a particular set of intents 874, and a particular personalized lexicon 886. Each gazetteer 884 may include domain-indexed lexical information associated with a particular user and/or device 110. For example, a Gazetteer A (884a) includes domain-indexed lexical information 886aa to 886an. A user's music domain lexical information might include album titles, artist names, and song names, for example, whereas a user's communications domain lexical information might include the names of contacts. Since every user's music collection and contact list is presumably different. This personalized information improves later performed entity resolution.

While FIG. 8 illustrates data in the NLU storage 873 being either domain specific or skill specific, it will be appreciated that, in at least some systems, the data in the NLU storage 873 may all be skill specific.

An NER component 862 applies grammar information 876 and lexical information 886 associated with a domain (associated with the recognizer 863 implementing the NER component 862) to determine a mention of one or more entities in text data. In this manner, the NER component 862 identifies "slots" (each corresponding to one or more particular words in text data) that may be useful for later processing. The NER component 862 may also label each slot with a type (e.g., noun, place, city, artist name, song name, etc.).

Each grammar 876 includes the names of entities (i.e., nouns) commonly found in natural language about the particular domain to which the grammar 876 relates, whereas the lexical information 886 is personalized to the user and/or the device 110 from which the user input originated. For example, a grammar 876 associated with a shopping domain may include a database of words commonly used when people discuss shopping.

A downstream process called entity resolution (discussed in detail elsewhere herein) links a slot of text data to a specific entity known to the system. To perform entity resolution, the NLU component 760 may utilize gazetteer information (884a-884n) stored in an entity library storage 882. The gazetteer information 884 may be used to match text data (representing a portion of the user input) with text data representing known entities, such as song titles, contact names, etc. Gazetteers 884 may be linked to users (e.g., a particular gazetteer may be associated with a specific user's music collection), may be linked to certain domains (e.g., a shopping domain, a music domain, a video domain, etc.), or may be organized in a variety of other ways.

In addition to implementing one or more grammars, an NER component 862 may use word embedding data 225 and/or phrase embedding data 610 to perform NER processing (e.g., to identify portions of text data relevant to processing performed by a downstream component). Word embedding data 225 and/or phrase embedding data 610 may be used in various manners to perform at least part of NER processing. In at least some examples, word embedding data 225 and/or phrase embedding data 610 may be used as features of a conditional random field (CRF) model.

In at least some examples, the word embedding data 225 and phrase embedding data 610, as stored in the word embedding storage 240 for example, may be global word embedding data in that the stored word embedding data 225 and phrase embedding data 610 is not specific to any particular skill. The natural language processing system 120 may store (and the word embedding component 210 may have access to) one or more normalization vectors representing how the global word embedding data 225 and/or phrase embedding data 610 is to be normalized to be specific to one or more skills. In other words, a normalization vector may represent how features of the global word embedding data 225 and/or phrase embedding data 610 are to be changed to better reflect how users speak (or a particular user speaks) natural language inputs related to a particular skill.

The NER component 862 may query the word embedding component 210 for a normalization vector associated with a particular skill. Such query may include the NER component 862 sending a skill identifier to the word embedding component 210. The word embedding component 210 may identify a normalization vector, associated with the skill identifier, representing how word and/or phrase embedding features are to be altered in global word embedding data to be specific to the skill. In at least some examples, the word embedding component 210 may apply the normalization vector to global word embedding data and/or global phrase embedding data (e.g., the component 210 may take a dot product of the normalization vector by the data to be normalized) to generate word embedding data and/or phrase embedding data specific to the skill (corresponding to the skill identifier), and send the skill-specific word embedding data and/or phrase embedding data to the NER component 862. In at least some other examples, the word embedding component 210 may send the normalization vector to the NER component 862. The NER component 862 may apply the normalization vector to global word embedding data and/or phrase embedding data (e.g., the NER component 862 may take a dot product of the normalization vector by the data to be normalized) to generate word and/or phrase embedding data specific to the skill. The NER component 862 may use the skill-specific word embedding data and/or phrase embedding data to identify portions of text data (representing a present spoken natural language input) that correspond to the skill.

Each recognizer XX63 may also include an intent classification (IC) component 864. An IC component 864 parses text data to determine an intent(s) (associated with the domain associated with the recognizer 863 implementing the IC component 864) that potentially represents the user input. An intent represents to an action a user desires be performed. An IC component 864 may communicate with a database 874 of words linked to intents. For example, a music intent database may link words and phrases such as "quiet," "volume off," and "mute" to a <Mute> intent. An IC component 864 identifies potential intents by comparing words and phrases in text data (representing at least a portion of the user input) to the words and phrases in an intents database 874 (associated with the domain that is associated with the recognizer 863 implementing the IC component 864). Additionally or alternatively, the IC component 864 may identify potential intents by comparing phrases in text data to phrases represented in phrase embedding data 610. In at least some examples, the phrase embedding data 610, implemented by an IC component 864, may be specific to the domain to which the IC component 864 corresponds. In at least some examples, a word embedding may be used as features of a multinomial logistic regression model to perform at least part of IC processing.

The intents identifiable by a specific IC component 864 are linked to domain-specific (i.e., the domain associated with the recognizer 863 implementing the IC component 864) grammar frameworks 876 with "slots" to be filled. Each slot of a grammar framework 876 corresponds to a portion of text data that the system believes corresponds to an entity. For example, a grammar framework 876 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 876 may not be structured as sentences, but rather based on associating slots with grammatical tags.

For example, an NER component 862 may parse text data to identify words as subject, object, verb, preposition, etc. based on grammar rules and/or models prior to recognizing named entities in the text data. An IC component 864 (implemented by the same recognizer 863 as the NER component 862) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886 (associated with the domain associated with the recognizer 863 implementing the NER component 862), attempting to match words and phrases in text data the NER component 862 previously tagged as a grammatical object or object modifier with those identified in the lexicon 886.

An NER component 862 may perform semantic tagging, which is the labeling of a word or combination of words according to their type/semantic meaning. An NER component 862 may parse text data using heuristic grammar rules, or a model may be constructed using techniques such as Hidden Markov Models, maximum entropy models, log linear models, conditional random fields (CRF), and the like.

For example, an NER component 862 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 identifies "Play" as a verb based on a word database associated with the music domain, which an IC component 864 (also implemented by the music domain recognizer) may determine corresponds to a <PlayMusic> intent. At this stage, no determination has been made as to the meaning of "mother's little helper" or "the rolling stones," but based on grammar rules and models, the NER component 862 has determined the text of these phrases relates to the grammatical object (i.e., entity) of the user input represented in the text data.

An NER component 862 may tag text data to attribute meaning thereto. For example, an NER component 862 may tag "play mother's little helper by the rolling stones" as: {domain} Music, {intent}<PlayMusic>, {artist name} rolling stones, {media type} SONG, and {song title} mother's little helper. For further example, the NER component 862 may tag "play songs by the rolling stones" as: {domain} Music, {intent}<PlayMusic>, {artist name} rolling stones, and {media type} SONG.

In at least some examples, a user may perform a dialog with the natural language processing system 120, but the user may not be a known user to the natural language processing system 120 (e.g., the user may not have created a user profile with the natural language processing system 120). This may result in the user recognition component 795 being unable to determine a user identifier corresponding to the dialog. In such instances, the NLU component 760 may selectively load, for use in performing NLU processing of a present turn, word embedding data and/or phrase embedding data associated with a skill identifier corresponding to a skill that was invoked to execute with respect to a previous turn of the dialog.

To selectively load global word embedding data and global phrase embedding data, the NLU component 760 may communicate with the word embedding component 210 via an application program interface (API). Global word embedding data and global phrase embedding data may be quiet large depending on the magnitude of the underlying training corpus, etc. When global word embedding data and global phrase embedding data is significantly large, sending such through an API at runtime may result in undesired latency. Thus, when global word embedding data and global phrase embedding data are significantly large, it may be beneficial to load and store global word embedding data and global phrase embedding data during offline operations, rather than at runtime. This may reduce latency experienced during runtime processing since the NLU component 760 will have access to global word and phrase embedding data from storage, without needing to request same at runtime from the word embedding component 210.

As described previously, the natural language processing system 120 may store multiple versions of word embedding data and/or phrase embedding data. For example, a first skill's word embedding data may be generated only from text data (e.g., corresponding to one or more Internet webpages), while a second skill's word embedding data may be generated using both text data (e.g., corresponding to one or more Internet webpages) and ASR output text data. Moreover, the natural language processing system 120 may store a first version of phrase embedding data that was generated only from text data (e.g., corresponding to one or more Internet webpages), and a second version of phrase embedding data generated using both text data (e.g., corresponding to one or more Internet webpages) and ASR output text data. As also described above, the word embedding data may be used to perform NER processing and the phrase embedding data may be used to perform IC processing.

At runtime, the NLU component 760 may be configured to use a version of the global phrase embedding data that corresponds to a skill's word embedding data. For example, performing NLU processing with respect to a user input may include performing NER processing with respect to the first skill and the second skill. The NER processing may include using the first skill's word embedding data (e.g., generated using only text data corresponding to one or more Internet webpages) to determine portions of the user input that are executable by the first skill, and using the second skill's word embedding data (e.g., generated using both text data (e.g., corresponding to one or more Internet webpages) and ASR output text data) to determine portions of the user input that are executable by the second skill.

A recognizer 863 may output tagged text data generated by an NER component 862 and an IC component 864, as described herein above. The NLU component 760 may compile the output tagged text data of the recognizers 863 into a single cross-domain n-best list 940 and may send the cross-domain n-best list 940 to a pruning component 950. Each entry of tagged text (e.g., each NLU hypothesis) represented in the cross-domain n-best list data 940 may be associated with a respective score indicating a likelihood that the NLU hypothesis corresponds to the domain associated with the recognizer 863 from which the NLU hypothesis was output. For example, the cross-domain n-best list data 940 may be represented as (with each line corresponding to a different NLU hypothesis):

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The pruning component 950 may sort the NLU hypotheses represented in the cross-domain n-best list data 940 according to their respective scores. The pruning component 950 may perform score thresholding with respect to the cross-domain NLU hypotheses. For example, the pruning component 950 may select NLU hypotheses associated with scores satisfying (e.g., meeting and/or exceeding) a threshold score. The pruning component 950 may additionally or alternatively perform number of NLU hypothesis thresholding. For example, the pruning component 950 may select the top scoring NLU hypothesis(es). The pruning component 950 may output a portion of the NLU hypotheses input thereto. The purpose of the pruning component 950 is to create a reduced list of NLU hypotheses so that downstream, more resource intensive, processes may only operate on the NLU hypotheses that most likely represent the user's intent.

The NLU component 760 may include a light slot filler component 952. The light slot filler component 952 can take text from slots represented in the NLU hypotheses output by the pruning component 950 and alter them to make the text more easily processed by downstream components. The light slot filler component 952 may perform low latency operations that do not involve heavy operations such as reference to a knowledge base. The purpose of the light slot filler component 952 is to replace words with other words or values that may be more easily understood by downstream components. For example, if a NLU hypothesis includes the word "tomorrow," the light slot filler component 952 may replace the word "tomorrow" with an actual date for purposes of downstream processing. Similarly, the light slot filler component 952 may replace the word "CD" with "album" or the words "compact disc." The replaced words are then included in the cross-domain n-best list data 960.

The cross-domain n-best list data 960 may be input to an entity resolution component 970. The entity resolution component 970 can apply rules or other instructions to standardize labels or tokens from previous stages into an intent/slot representation. The precise transformation may depend on the domain. For example, for a travel domain, the entity resolution component 970 may transform text corresponding to "Boston airport" to the standard BOS three-letter code referring to the airport. The entity resolution component 970 can refer to a knowledge base that is used to specifically identify the precise entity referred to in each slot of each NLU hypothesis represented in the cross-domain n-best list data 960. Specific intent/slot combinations may also be tied to a particular source, which may then be used to resolve the text. In the example "play songs by the stones," the entity resolution component 970 may reference a personal music catalog, Amazon Music account, a user profile, or the like. The entity resolution component 970 may output an altered n-best list that is based on the cross-domain n-best list 960 but that includes more detailed information (e.g., entity identifiers) about the specific entities mentioned in the slots and/or more detailed slot data that can eventually be used by a skill. The NLU component 760 may include multiple entity resolution components 970 and each entity resolution component 970 may be specific to one or more domains.

The NLU component 760 may include a ranker 990. The ranker 990 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 970.

The ranker 990 may apply re-scoring, biasing, or other techniques. The ranker 990 may consider not only the data output by the entity resolution component 970, but may also consider other data 991. The other data 991 may include a variety of information. For example, the other data 991 may include skill rating or popularity data. For example, if one skill has a high rating, the ranker 990 may increase the score of a NLU hypothesis that may be processed by the skill. The other data 991 may also include information about skills that have been enabled by the user that originated the user input. For example, the ranker 990 may assign higher scores to NLU hypotheses that may be processed by enabled skills than NLU hypotheses that may be processed by non-enabled skills. The other data 991 may also include data indicating user usage history, such as if the user that originated the user input regularly uses a particular skill or does so at particular times of day. The other data 991 may additionally include data indicating date, time, location, weather, type of device 110, user identifier, context, as well as other information. For example, the ranker 990 may consider when any particular skill is currently active (e.g., music being played, a game being played, etc.). The ranker 990 may output NLU results data 985.

As illustrated and described, the entity resolution component 970 is implemented prior to the ranker 990. The entity resolution component 970 may alternatively be implemented after the ranker 990. Implementing the entity resolution component 970 after the ranker 990 limits the NLU hypotheses processed by the entity resolution component 970 to only those hypotheses that successfully pass through the ranker 990.

The ranker 990 may be a global ranker (e.g., one that is not specific to any particular domain). Alternatively, the NLU component 760 may implement one or more domain-specific rankers. Each domain-specific ranker may rank NLU hypotheses associated with the domain. Each domain-specific ranker may output an n-best list of ranked hypotheses (e.g., 5-10 hypotheses).

As described above, the natural language processing system 120 may perform speech processing using two different components (e.g., the ASR component 750 and the NLU component 760). One skilled in the art will appreciate that the natural language processing system 120, in at least some examples, may implement a spoken language understanding (SLU) component that is configured to process audio data 711 to generate NLU results data.

In some examples, the SLU component may be equivalent to the ASR component 750 and the NLU component 760. For example, the SLU component may process audio data 711 and generate NLU data. The NLU data may include intent data and/or slot data so that directives may be determined based on the intent data and/or the slot data. While the SLU component may be equivalent to a combination of the ASR component 750 and the NLU component 760, the SLU component may process audio data 711 and directly generate the NLU data, without an intermediate step of generating text data (as does the ASR component 750). As such, the SLU component may take audio data 711 representing speech and attempt to make a semantic interpretation of the speech. That is, the SLU component may determine a meaning associated with the speech and then implement that meaning. For example, the SLU component may interpret audio data 711 representing speech from the user 5 in order to derive a desired action. In some examples, the SLU component outputs a most likely NLU response (e.g., hypothesis) recognized in the audio data 711, or multiple hypotheses in the form of a lattice or an N-best list with individual hypotheses corresponding to confidence scores or other scores (such as probability scores, etc.).

Referring back to FIG. 7, the natural language processing system 120 may include one or more skills 790 configured to execute with respect to NLU results data. For example, a weather service skill may enable the natural language processing system 120 to output weather information, a car service skill may enable the natural language processing system 120 to book a trip with respect to a taxi or ride sharing service, a restaurant skill may enable the natural language processing system 120 to order a pizza with respect to the restaurant's online ordering system, etc. A skill 790 may operate in conjunction between the natural language processing system 120 and other devices, such as the device 110, in order to complete certain functions. Inputs to a skill 790 may come from speech processing interactions or through other interactions or input sources. A skill 790 may include hardware, software, firmware, or the like that may be dedicated to a particular skill 790 or shared among different skills 790.

In addition or alternatively to being implemented by the natural language processing system 120, a skill 790 may be implemented by a skill system 725. Such may enable a skill system 725 to execute specific functionality in order to provide data or perform some other action requested by a user.

Skills may be associated with different domains, such as smart home, music, video, flash briefing, shopping, and custom (e.g., skills not associated with any pre-configured domain).

The natural language processing system 120 may be configured with a single skill 790 dedicated to interacting with more than one skill system 725.

The natural language processing system 120 may include a TTS component 780. The TTS component 780 may generate audio data (e.g., synthesized speech) from text data using one or more different methods. Text data input to the TTS component 780 may come from a skill 790, the orchestrator component 730, or another component of the natural language processing system 120.

In one method of synthesis called unit selection, the TTS component 780 matches text data against a database of recorded speech. The TTS component 780 selects matching units of recorded speech and concatenates the units together to form audio data. In another method of synthesis called parametric synthesis, the TTS component 780 varies parameters such as frequency, volume, and noise to generate audio data including an artificial speech waveform. Parametric synthesis uses a computerized voice generator, sometimes called a vocoder.

As mentioned herein, the natural language processing system 120 may include a user recognition component 795. In at least some examples, the user recognition component 795 may be implemented as a skill 790, or as part of a skill system 725.

The user recognition component 795 may recognize one or more users using a variety of data. The user recognition component 795 may take as input the audio data 711 and/or the text data 713. The user recognition component 795 may perform user recognition by comparing speech characteristics, in the audio data 711, to stored speech characteristics of users. The user recognition component 795 may additionally or alternatively perform user recognition by comparing biometric data (e.g., fingerprint data, iris data, etc.), received by the natural language processing system 120 in correlation with a user input, to stored biometric data of users. The user recognition component 795 may additionally or alternatively perform user recognition by comparing image data (e.g., including a representation of at least a feature of a user), received by the natural language processing system 120 in correlation with a user input, with stored image data including representations of features of different users. The user recognition component 795 may perform other or additional user recognition processes, including those known in the art. For a particular user input, the user recognition component 795 may perform processing with respect to stored data of users associated with the device 110 that captured the user input.

The user recognition component 795 determines whether a user input originated from a particular user. For example, the user recognition component 795 may generate a first value representing a likelihood that a user input originated from a first user, a second value representing a likelihood that the user input originated from a second user, etc. The user recognition component 795 may also determine an overall confidence regarding the accuracy of user recognition operations.

The user recognition component 795 may output a single user identifier corresponding to the most likely user that originated the user input. Alternatively, the user recognition component 795 may output multiple user identifiers (e.g., in the form of an N-best list) with respective values representing likelihoods of respective users originating the user input.

The output of the user recognition component 795 may be used to inform NLU processing, processing performed by a skill 790 or skill system 725, as well as processing performed by other components of the natural language processing system 120 and/or other systems.

The natural language processing system 120 may include profile storage 770. The profile storage 770 may include a variety of information related to individual users, groups of users, devices, etc. that interact with the natural language processing system 120. As used herein, a "profile" refers to a set of data associated with a user, group of users, device, etc. The data of a profile may include preferences specific to the user, group of users, device, etc.; input and output capabilities of one or more devices; Internet connectivity information; user bibliographic information; subscription information; as well as other information.

The profile storage 770 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the natural language processing system 120 with permission to allow the skill to execute with respect to the user's inputs. If a user does not enable a skill, the natural language processing system 120 may not permit the skill to execute with respect to the user's inputs.

The profile storage 770 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 770 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

Figure 10:
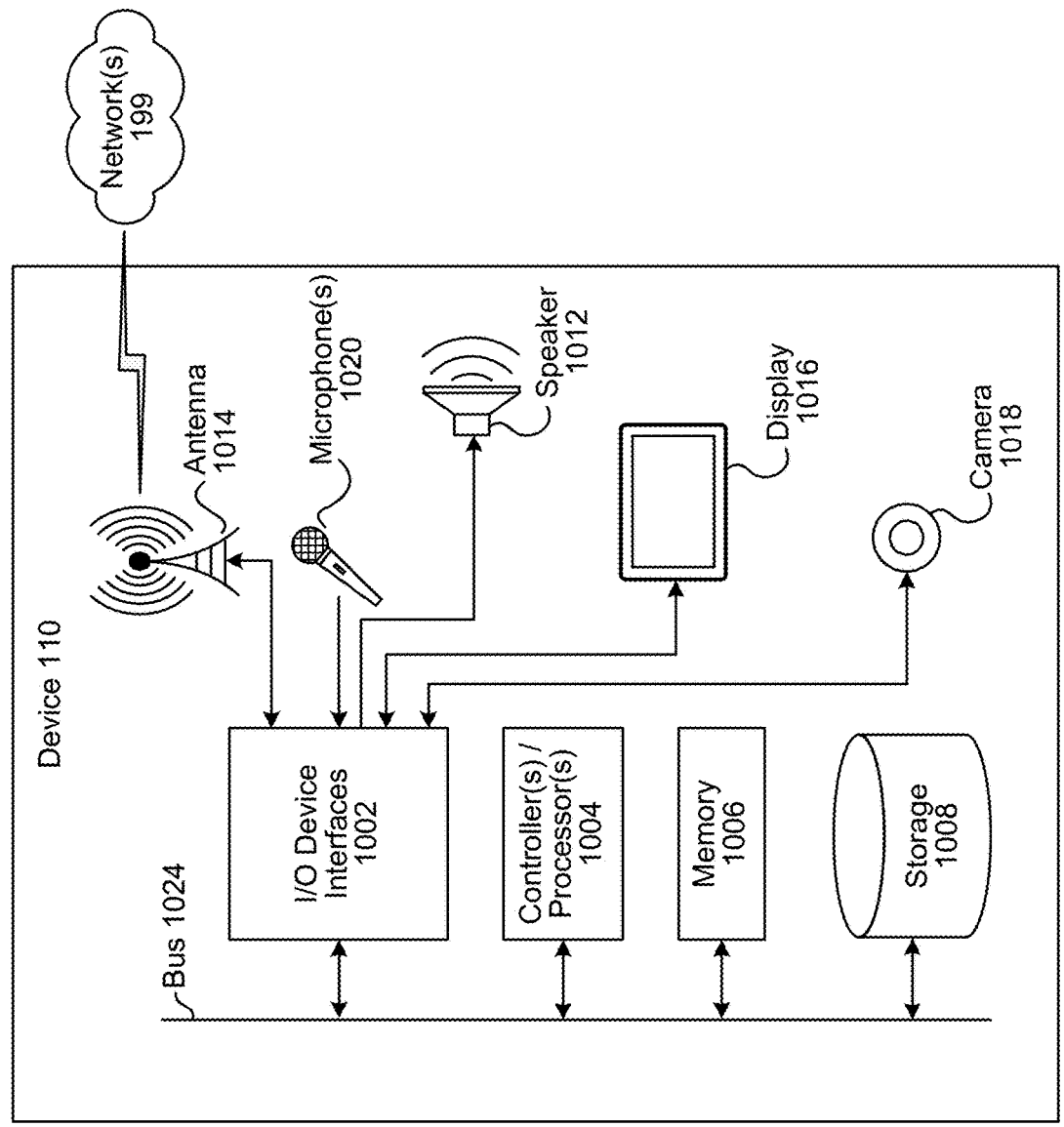
FIG. 10 is a block diagram conceptually illustrating example components of a device, in accordance with embodiments of the present disclosure.
Figure 11:
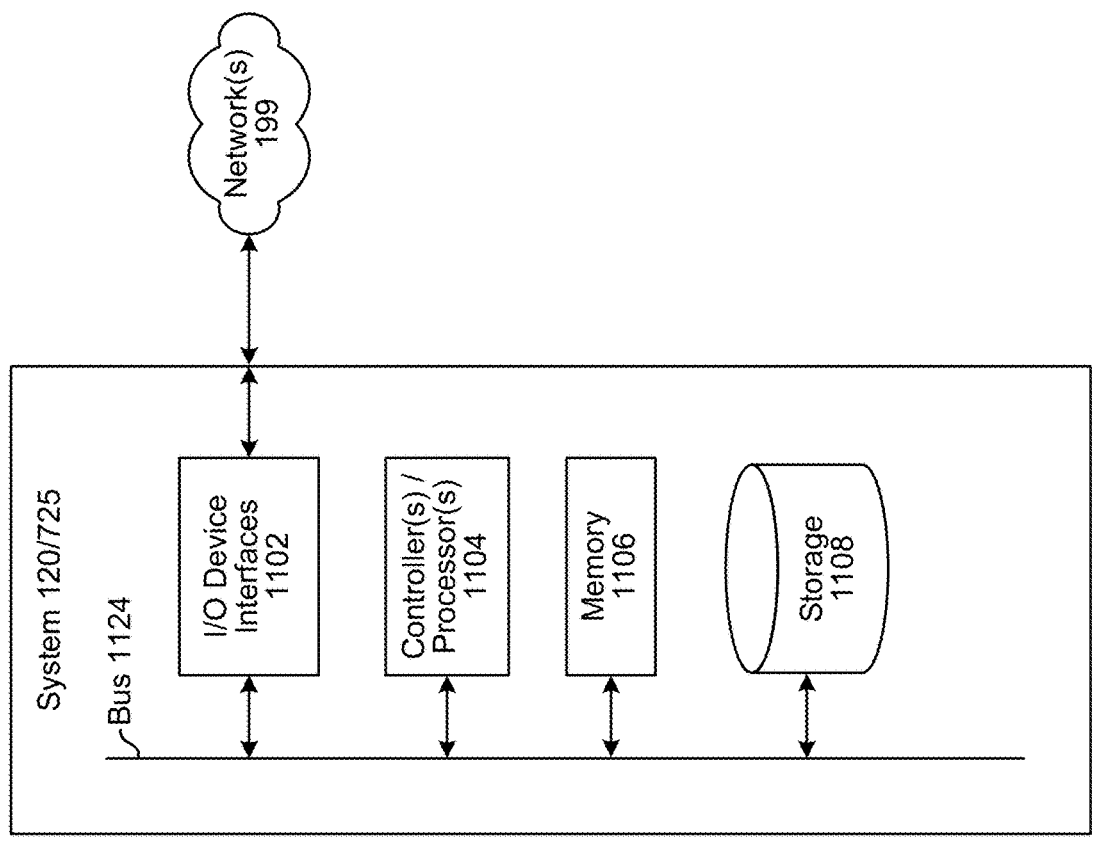
FIG. 11 is a block diagram conceptually illustrating example components of a system, in accordance with embodiments of the present disclosure.

FIG. 10 is a block diagram conceptually illustrating a device 110/112 that may be used with the system. FIG. 11 is a block diagram conceptually illustrating example components of a remote device, such as the natural language processing system 120, which may assist with ASR processing, NLU processing, etc., and a skill system 725. A system (120/725) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/725) may be included in the overall system 100 of the present disclosure, such as one or more natural language processing systems 120 for performing ASR processing, one or more natural language processing systems 120 for performing NLU processing, one or more skill systems 725, etc. In operation, each of these systems may include computer-readable and computer-executable instructions that reside on the respective device (120/725), as will be discussed further below.

Each of these devices (110/120/725) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/725) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/725) may also be connected to removable or external non-volatile memory and/or storage (such as a removable memory card, memory key drive, networked storage, etc.) through respective input/output device interfaces (1002/1102).

Computer instructions for operating each device (110/120/725) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/725) includes input/output device interfaces (1002/1102). A variety of components may be connected through the input/output device interfaces (1002/1102), as will be discussed further below. Additionally, each device (110/120/725) may include an address/data bus (1024/1124) for conveying data among components of the respective device. Each component within a device (110/120/725) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1014, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110, the natural language processing system 120, or a skill system 725 may include their own dedicated processors, memory, and/or storage. Alternatively, one or more of the components of the device(s) 110, the natural language processing system 120, or a skill system 725 may utilize the I/O interfaces (1002/1102), processor(s) (1004/1104), memory (1006/1106), and/or storage (1008/1108) of the device(s) 110, natural language processing system 120, or the skill system 725, respectively. Thus, the ASR component 750 may have its own I/O interface(s), processor(s), memory, and/or storage; the NLU component 760 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language processing system 120, and a skill system 725, as described herein, are illustrative, and may be located as a stand-alone device or may be included, in whole or in part, as a component of a larger device or system.

Figure 12:
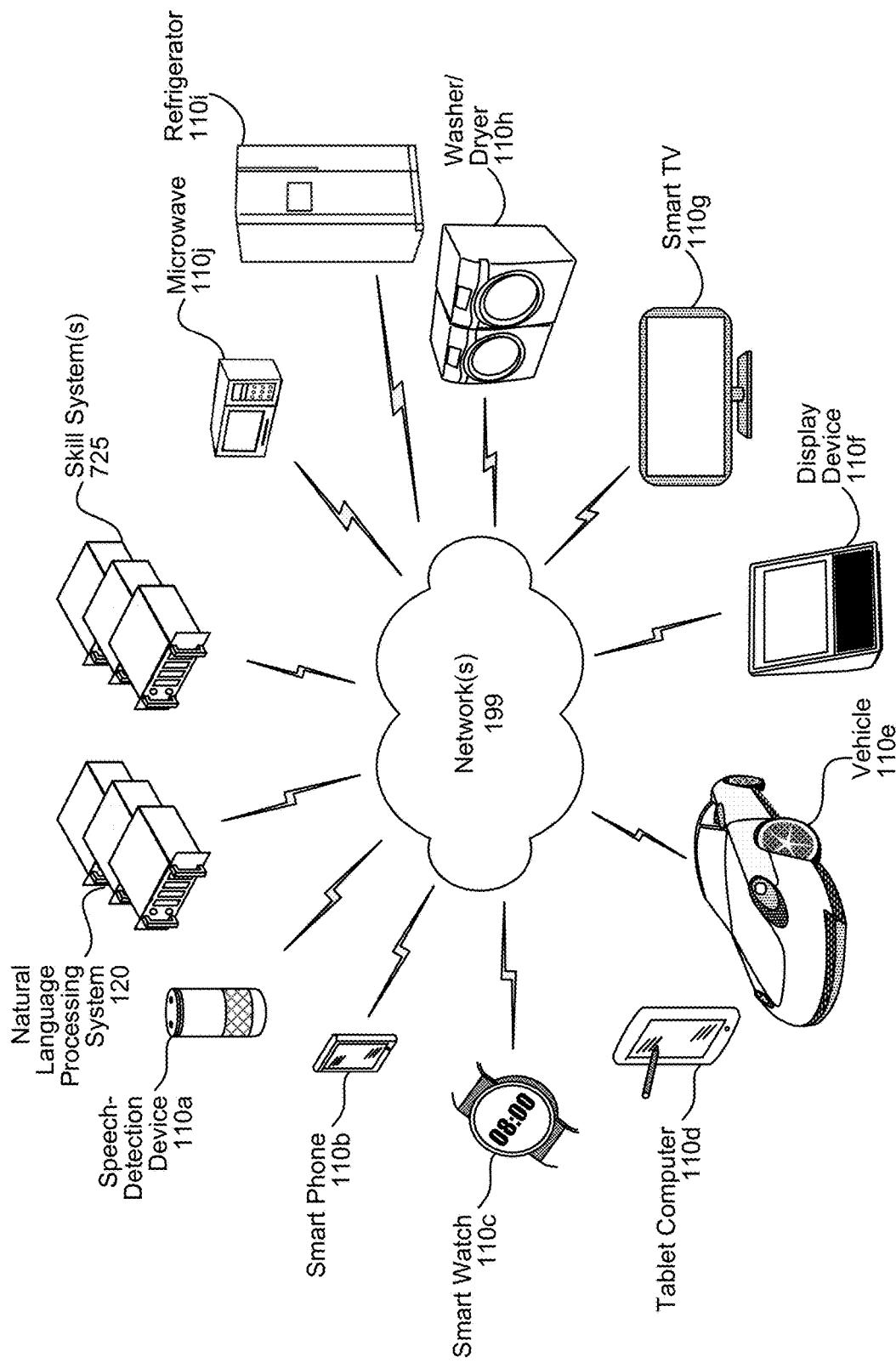
FIG. 12 illustrates an example of a computer network for use with the overall system, in accordance with embodiments of the present disclosure.

As illustrated in FIG. 12, multiple devices (110a-110j, 120, 725) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the natural language processing system 120, the skill system(s) 725, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 750, the NLU component 760, etc. of the natural language processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
determining raw data representing a first spoken natural language input as determined by automatic speech recognition (ASR) processing;
generating raw utterance data from the raw data, the raw utterance data being generated by selecting, from the raw data, text data corresponding to the first spoken natural language input;
generating an ASR sample corpus using the raw utterance data;
generating a first word embedding data vector using the ASR sample corpus;
after generating the first word embedding data vector, receiving, from a first device associated with a user profile, audio data representing a second spoken natural language input;
performing ASR processing on the audio data to generate text data representing the second spoken natural language input;
performing NLU processing including:
using the first word embedding data vector, performing named entity recognition (NER) processing on the text data to determine a named entity relevant to a first component that operates on NLU data;
sending, to the first component, first NLU data representing the named entity;
receiving, from the first component, second data corresponding to a response to the second spoken natural language input; and
sending, to the first device, the second data for output.

2. The method of claim 1, further comprising:
determining raw extensible markup language (XML) data representing non-ASR processing output natural language text data; and
generating a second word embedding data vector using the non-ASR processing output natural language text data,
wherein the NLU processing further includes:
using the second word embedding data vector, performing NER processing on the text data to determine a second named entity relevant to a second component that operates on NLU data.

3. The method of claim 1, wherein the first word embedding data vector is generic to a plurality of components that operate on NLU data, and wherein the method further comprises:
determining a normalization vector representing how features, in a word embedding data vector, are to make the word embedding data vector specific to the first component; and
generating a second word embedding data vector by performing a dot product multiplication of first word embedding data vector by the normalization vector, the second word embedding data vector being specific to the first component,
wherein the NER processing uses the second word embedding data vector to determine the named entity.

4. A system comprising:
at least one processor; and
at least one memory comprising instructions that, when executed by the at least one processor, cause the system to:
receive first text data representing a first natural language user input;
receive first word embedding data generated using at least second text data output from runtime automatic speech recognition (ASR) processing of a second natural language user input;
using the first word embedding data, perform natural language understanding (NLU) processing on the first text data to determine first NLU data corresponding to a first component that operates on NLU data;
send, to the first component, the first NLU data;
receive, from the first component, first data corresponding to a response to the first natural language user input; and
cause the first data to be output.

5. The system of claim 4, wherein the first word embedding data is generic to a plurality of components that operate on NLU data and wherein the at least one memory further comprises instructions that, when executed by the at least one processor, further cause the system to:
determine a normalization vector associated with the first component, the normalization vector representing how features, in word embedding data, are to make the word embedding data specific to the first component; and
generate second word embedding data by applying the normalization vector to the first word embedding data, wherein the NLU processing is performing using the second word embedding data.

6. The system of claim 5, wherein the at least one memory further comprises instructions that, when executed by the at least one processor, further cause the system to:
prior to receiving the first text data, store, by an NLU component of the system, the first word embedding data,
wherein the normalization vector is determined by the NLU component based at least in part on the NLU component receiving the first text data.

7. The system of claim 5, wherein the at least one memory further comprises instructions that, when executed by the at least one processor, further cause the system to:
determine a user profile corresponding to the first natural language user input; and
determine the first component is represented in the user profile as being enabled to process with respect to natural language user inputs,
wherein the normalization vector is determine after determining the first component is represented as enabled in the user profile.

8. The system of claim 5, wherein the at least one memory further comprises instructions that, when executed by the at least one processor, further cause the system to:
determine third word embedding data generated without using text data output from runtime ASR processing, the third word embedding data being generic to a plurality of components that operate on NLU data;
determine a second normalization vector associated with a second component that operates on NLU data, the second normalization vector representing how features, in word embedding data, are to make the word embedding data specific to the second component; and
generate fourth word embedding data by applying the second normalization vector to the third word embedding data, wherein the NLU processing includes using the fourth word embedding data to determine second NLU data corresponding to the second component.

9. The system of claim 4, wherein the first word embedding data is further generated using third text representing natural language text of an Internet webpage.

10. The system of claim 4, wherein the first word embedding data is further generated using third text corresponding to a previous typed natural language user input.

11. The system of claim 4, wherein the at least one memory further comprises instructions that, when executed by the at least one processor, further cause the system to:
   determine phrase embedding data generated using (i) at least one webpage title and (ii) the at least second text data,
   wherein the NLU processing is performed using the first word embedding data and the phrase embedding data.

12. The system of claim 11, wherein the at least one memory further comprises instructions that, when executed by the at least one processor, further cause the system to:
   as part of the NLU processing, perform named entity recognition (NER) processing using the first word embedding data and the phrase embedding data.

13. A method comprising:
   receiving first text data representing a first natural language user input;
   receiving first word embedding data generated using at least second text data output from runtime automatic speech recognition (ASR) processing of a second natural language user input;
   using the first word embedding data, performing natural language understanding (NLU) processing on the first text data to determine first NLU data corresponding to a first component that operates on NLU data;
   sending, to the first component, the first NLU data;
   receiving, from the first component, first data corresponding to a response to the first natural language user input; and
   causing the first data to be output.

14. The method of claim 13, wherein the first word embedding data is generic to a plurality of components that operate on NLU data and wherein the method further comprises:
   determining a normalization vector associated with the first component, the normalization vector representing how features, in word embedding data, are to make the word embedding data specific to the first component; and
   generating second word embedding data by applying the normalization vector to the first word embedding data,
   wherein the NLU processing is performing using the second word embedding data.

15. The method of claim 14, further comprising:
   prior to receiving the first text data, storing, by an NLU component of a natural language processing system, the first word embedding data,
   wherein the normalization vector is determined by the NLU component based at least in part on the NLU component receiving the text data.

16. The method of claim 14, further comprising:
   determining a user profile corresponding to the natural language user input; and
   determining the first component is represented in the user profile as being enabled to process with respect to natural language user inputs,
   wherein the normalization vector is determine after determining the first component is represented as enabled in the user profile.

17. The method of claim 14, further comprising:
   determining third word embedding data generated without using text data output from runtime ASR processing, the third word embedding data being generic to a plurality of components that operate on NLU data;
   determining a second normalization vector associated with a second component that operates on NLU data, the second normalization vector representing how features, in word embedding data, are to make the word embedding data specific to the second component; and
   generating fourth word embedding data by applying the second normalization vector to the third word embedding data,
   wherein the NLU processing includes using the fourth word embedding data to determine second NLU data corresponding to the second component.

18. The method of claim 13, wherein the first word embedding data is further generated using third text representing natural language text of an Internet webpage.

19. The method of claim 13, wherein the first word embedding data is further generated using third text corresponding to a previous typed natural language user input.

20. The method of claim 13, further comprising:
   determining phrase embedding data generated using (i) at least one webpage title and (ii) the at least second text data,
   wherein the NLU processing is performed using the first word embedding data and the phrase embedding data.

* * * * *